United States Patent
Shon et al.

(10) Patent No.: US 10,615,390 B2
(45) Date of Patent: Apr. 7, 2020

(54) ELECTRODE-COMPOSITE SEPARATOR ASSEMBLY FOR LITHIUM BATTERY AND BATTERY INCLUDING THE SAME

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Jeongkuk Shon, Hwaseong-si (KR); Junhwan Ku, Seongnam (JP); Minsang Song, Seongnam-si (KR); Sangmin Ji, Yongin-si (KR); Hana Kim, Suwon-si (KR); Myungkook Park, Suwon-si (KR); Byungmin Lee, Suwon-si (KR); Jaeman Choi, Seongnam-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 597 days.

(21) Appl. No.: 15/168,412

(22) Filed: May 31, 2016

(65) Prior Publication Data

US 2017/0149039 A1    May 25, 2017

(30) Foreign Application Priority Data

Nov. 20, 2015  (KR) .................. 10-2015-0163345

(51) Int. Cl.
*H01M 2/16*     (2006.01)
*H01M 10/0525*  (2010.01)
(Continued)

(52) U.S. Cl.
CPC ......... *H01M 2/1673* (2013.01); *H01M 2/166* (2013.01); *H01M 2/1653* (2013.01);
(Continued)

(58) Field of Classification Search
CPC .. H01M 2/1673; H01M 2/168; H01M 2/1686; H01M 2/166; H01M 2/1666; H01M 4/621; H01M 4/622
See application file for complete search history.

(56) References Cited

U.S. PATENT DOCUMENTS 5,834,135 A    11/1998   Pendalwar et al.
6,322,923 B1   11/2001   Spotnitz et al.
(Continued)

FOREIGN PATENT DOCUMENTS

JP    5337768 B2    8/2013
JP    5768369 B2    7/2015
(Continued)

OTHER PUBLICATIONS

Machine translation of WO2013031690 originally published Mar. 2013 to Sasaki.*
(Continued)

*Primary Examiner* — Jonathan G Leong
(74) *Attorney, Agent, or Firm* — Cantor Colburn LLP

(57) ABSTRACT

An electrode-composite separator assembly for a lithium battery, the electrode-composite separator assembly including an electrode; and a composite separator, wherein the composite separator includes a separator, and a coating film disposed on a surface of the separator, wherein the coating film includes a copolymer including an electrolyte-insoluble repeating unit and a repeating unit represented by Formula 1; and at least one selected from an inorganic particle and an organic-inorganic particle, wherein the electrode-composite separator assembly does not have an exothermic peak between 400° C. to 480° C. when analyzed by differential scanning calorimetry, wherein Formula 1 is Formula 1

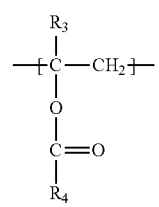

wherein, in Formula 1, $R_3$ is hydrogen or a $C_1$-$C_5$ alkyl group, and $R_4$ is a $C_1$-$C_{10}$ alkyl group. Also, a lithium battery including the electrode-composite separator assembly.

7 Claims, 17 Drawing Sheets

(51) Int. Cl.
*H01M 10/056* (2010.01)
*H01M 10/0585* (2010.01)

(52) U.S. Cl.
CPC ....... *H01M 2/1686* (2013.01); *H01M 10/056* (2013.01); *H01M 10/0525* (2013.01); *H01M 10/0585* (2013.01); *Y02T 10/7011* (2013.01)

(56) References Cited

U.S. PATENT DOCUMENTS

| | | | |
|---|---|---|---|
| 8,853,286 B2 | 10/2014 | Elabd et al. | |
| 9,136,515 B2 | 9/2015 | Kakibe et al. | |
| 2008/0292968 A1* | 11/2008 | Lee .................. | H01M 2/14 |
| | | | 429/247 |
| 2010/0003590 A1* | 1/2010 | Park .................. | H01M 2/1673 |
| | | | 429/144 |
| 2010/0206804 A1* | 8/2010 | Weber ................ | H01M 2/162 |
| | | | 210/500.21 |
| 2012/0135308 A1 | 5/2012 | Loveridge et al. | |
| 2017/0092915 A1 | 3/2017 | Ku et al. | |

FOREIGN PATENT DOCUMENTS

| | | | |
|---|---|---|---|
| KR | 1019990043695 A | 6/1999 | |
| KR | 1020150064438 A | 6/2015 | |
| KR | 2017-0037453 A | 4/2017 | |
| WO | WO-2013031690 A1 * | 3/2013 | ............ H01M 4/622 |

OTHER PUBLICATIONS

Lee et al.,"Electrochemical effect of coating layer on the separator based on PVdF and PE non-woven matrix", Journal of Power Sources, vol. 146, 2005, pp. 431-435.

\* cited by examiner

PVAc BLOCK
MAY BE DISSOLVED
IN ELECTROLYTE

BONDING LAYER

PORTION OF PVAc IN TOUCH WITH
A SURFACE OF ELECTRODE MAY
REACT WITH ELECTROLYTE,
FORMING SEI LAYER

FIG. 10A

| TO POSITIVE ELECTRODE | | | | | |
|---|---|---|---|---|---|
| Voltage range | 3.0~3.5V | 3.0~3.8V | 3.0~4.0V | 3.0~4.2V | 3.0~4.4V |
| DEGREE OF BONDING | X△ | △△ | △○ | ○○ | ○○ |

FIG. 10B

| BONDING TO NEGATIVE ELECTRODE | | | | |
|---|---|---|---|---|
| Voltage range | 1.0~0.7V | 1.0~0.4V | 1.0~0.2V | 1.0~0.001V |
| DEGREE OF BONDING | X△ | X△ | △△ | ○○ |

ELECTRODE-COMPOSITE SEPARATOR ASSEMBLY FOR LITHIUM BATTERY AND BATTERY INCLUDING THE SAME

CROSS-REFERENCE TO RELATED APPLICATION

This application claims the benefit of and priority to Korean Patent Application No. 10-2015-0163345, filed on Nov. 20, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to an electrode-composite separator assembly for a lithium battery, and a lithium battery including the same.

2. Description of the Related Art

Lithium batteries are high-performance batteries having the highest energy density among other currently available secondary batteries, and are applicable to various fields, such as electric vehicles.

A lithium battery may have a structure where a separator is between a positive electrode and a negative electrode. A polyolefin-based separator may be mostly used as the separator. However, as lithium ion batteries have been used as a battery for electric vehicles in recent years, the polyolefin-based separator has insufficient heat resistance and mechanical stability. In addition, the thickness of a battery may increase in order to obtain a large capacity battery; however, when electrodes are bonded to a separator of a lithium battery using heat welding, uniform heat conduction may be difficult, and bonding force of the electrodes to the separator may not be sufficient, thus decreasing stability and durability thereof. Accordingly, there is a need for an improved lithium battery.

SUMMARY

Provided is a novel electrode-composite separator assembly for a lithium battery.

Provided is a lithium battery with improved cell performance including the electrode-composite separator assembly.

Additional aspects will be set forth in part in the description which follows and, in part, will be apparent from the description, or may be learned by practice of the presented embodiments.

According to an aspect of an embodiment, provided is an electrode-composite separator assembly for a lithium battery, the electrode-composite separator assembly including an electrode; and a composite separator, wherein the composite separator includes a separator; and a coating film disposed on a surface of the separator, wherein the coating film includes a copolymer including an electrolyte-insoluble repeating unit and a repeating unit represented by Formula 1; and at least one selected from an inorganic particle and an organic-inorganic particle, wherein the electrode-composite separator assembly does not have an exothermic peak between 400° C. to 480° C. when analyzed by differential scanning calorimetry, wherein Formula 1 is

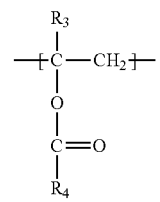

Formula 1 wherein, in Formula 1, $R_3$ is hydrogen or a $C_1$-$C_5$ alkyl group, and $R_4$ is a $C_1$-$C_{10}$ alkyl group.

According to an aspect of another embodiment, a lithium battery includes the above-described electrode-composite separator assembly.

Also disclosed is a method of manufacturing an electrode-composite separator assembly for a lithium battery, the method including: disposing a composite separator on a cathode or an anode, wherein the composite separator includes a separator, and a coating film disposed on a surface of the separator, wherein the coating film includes a copolymer including an electrolyte-insoluble repeating unit and a repeating unit represented by Formula 1, and at least one selected from an inorganic particle and an organic-inorganic particle, wherein the electrode-composite separator assembly does not have an exothermic peak between about 400° C. to about 480° C. when analyzed by differential scanning calorimetry, and wherein Formula 1 is

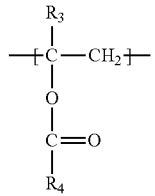

Formula 1 wherein, in Formula 1, $R_3$ is hydrogen or a $C_1$-$C_5$ alkyl group, and $R_4$ is a $C_1$-$C_{10}$ alkyl group to form a first subassembly; and then disposing the first subassembly on the other of the cathode for the anode to form a second subassembly; disposing the second subassembly in a case; adding an electrolyte to the case to form a lithium battery; and charging the lithium battery to form the electro-composite separator assembly.

BRIEF DESCRIPTION OF THE DRAWINGS

These and/or other aspects will become apparent and more readily appreciated from the following description of the embodiments, taken in conjunction with the accompanying drawings in which:

FIG. 10A shows coin cells manufactured and in Example 8; and

FIG. 10B shows coin-cells manufactured in Example 9.

DETAILED DESCRIPTION

Figure 1A:
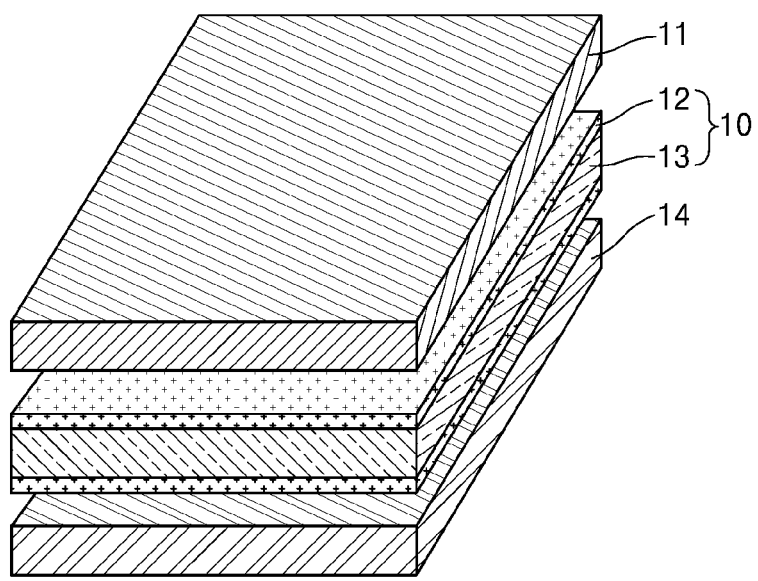
FIG. 1A illustrates an embodiment of a schematic view of a lithium battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. "Or" means "and/or." As used herein, the term "and/or" includes any and all combinations of one or more of the associated listed. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

With reference to the attached drawings, an electrode-composite separator assembly for a lithium battery and a lithium battery using the same will be disclosed in further detail.

An electrode-composite separator assembly for a lithium battery is provided, and the electrode-composite separator assembly may include an electrode; and a composite separator, wherein the composite separator may include a separator, and a coating film disposed on a surface of the separator, wherein the coating film may include a copolymer including an electrolyte-insoluble repeating unit and a repeating unit represented by Formula 1, and at least one selected from an inorganic particle and an organic-inorganic particle, wherein the electrode-composite separator assembly does not have an exothermic peak between about 400° C. to about 480° C. when analyzed by differential scanning calorimetry (DSC), wherein Formula 1 is

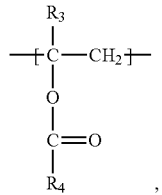

Formula 1 wherein, in Formula 1, $R_3$ may be hydrogen or a $C_1$-$C_5$ alkyl group, and $R_4$ may be a $C_1$-$C_{10}$ alkyl group.

The electrode-composite separator assembly for a lithium battery is electrochemically bonded. The expression "electrochemically bonded" as used herein refers to a product of bonding an electrode to a composite separator using an electrochemical process, such as formation process of a battery, and without using a heat and/or pressure bonding as may be used to bond an electrode to a separator using heat and pressure. In the electrochemical bonding process, a copolymer contained in the composite separator and including the repeating unit represented by Formula 1, may serve to generate a chemical bond between the electrode and the separator.

A lithium battery may use a polyolefin-based membrane, such as a polyethylene membrane as a separator. However, a polyolefin-based membrane may not provide suitable wettability to a hydrophilic electrolyte due to having hydrophobic characteristics and a polyolefin-based membrane may have considerably poor heat resistance. To improve the wettability of an electrolyte to the polyolefin-based membrane and heat-resistance of the polyolefin-based membrane, a separator including a binder having improved heat-resistance was developed. However, the heat-resistance of this separator may deteriorate when the separator is exposed to high-temperature conditions of 150° C. or higher. The separator including a binder with improved heat resistance may have improved air-permeability, and may include large-size pores due to difficulty in pore size control and consequentially reduce the safety of the lithium battery.

A lithium battery used in a flexible device may undergo repeated deformation, and consequentially cause misalignment of a separator in the battery. The misalignment of the separator may cause a positive electrode and a negative electrode to contact one another and consequentially an internal short may occur and thus significantly reduce the safety of the lithium battery.

To improve these drawbacks, the present disclosure provides an electrode-composite separator assembly in which electrodes and a separator are integrated together, without using a polyolefin-based membrane. By including the electrode-composite separator assembly, a lithium battery with improved heat resistance, structural stability, and electrochemical characteristics may be manufactured. The expression "integrated" as used herein is used to refer to a structure in which electrodes and a composite separator are strongly bonded to each other without an intermediate membrane therebetween.

An exothermic peak in DSC analysis and a weight loss temperature in thermogravimetric analysis (TGA) of an electrode-composite separator assembly according to an embodiment may differ from those of an electrode separator assembly in which electrodes are bonded to a separator by a heat fusion method. From this fact, it was found that an electrode-composite separator assembly according to an embodiment may have improved chemical characteristics, as compared with those of a heat bonded electrode separator assembly.

According to another embodiment, in DSC analysis on an electrode-composite separator assembly, an exothermic peak may not be found at a temperature from 400° C. to 480° C., and in some embodiments, from 425° C. to 480° C., or from 450° C. to 480° C.

The above-described DSC analysis may be carried out under a condition of a nitrogen gas atmosphere, a measurement temperature from 20° C. to 600° C., and a heating rate of 1° C. per minute (° C./min) to 10° C./min, and in some embodiments, 3° C./min, 5° C./min, or 8° C./min.

At least one peak showing reduction of weight may appear at a temperature in a range of about 275° C. to 450° C., and in some embodiments, 275° C. to 400° C., or 300° C. to 375° C., in a derivative thermogravimetric (DTG) curve from TGA of an electrode-composite separator assembly according to an embodiment. A DTG curve may be a differential weight loss curve in TGA. The gradient of the DTG curve may indicate a rate of weight loss or weight gain.

TGA may be carried out under a condition of an air atmosphere, at a measurement temperature from 20° C. to 600° C., and a heating rate of 1° C./min to 10° C./min, and in some embodiments, 3° C./min, 5° C./min, or 8°/min.

A first peak may appear at a temperature in a range of about 275° C. to 375° C. in a DTG curve shown in TGA on an electrode-composite separator assembly according to an embodiment. In the DTG curve, a second peak may appear at a temperature from 375° C. to 450° C. In this regard, the second peak may have an intensity equivalent to or greater than that of the first peak.

An electrode-composite separator assembly according to an embodiment may have an integrated structure in which electrodes and a composite separator are integrated together. Since the composite separator has such an integrated structure, a positive electrode may be prevented from being in a direct contact with a negative electrode, while the positive electrode may be disposed as close as possible to the negative electrode, thus maximizing electrochemical characteristics.

An electrode-composite separator assembly according to an embodiment may be assembled, and then undergo a charging and discharging process, e.g., a formation process, without a separate bonding process of electrodes to a separator, thus electrochemically bonding a composite separator to electrodes by in-situ bonding.

The formation process is for activating a battery by repeating charging and discharging. Such a formation process may vary depending on the composition of a composite separator and the type of electrode.

Such formation process may be carried out by repeating charging and discharging with a constant current or a constant voltage. The charging and discharging may be carried out with a voltage range of about 2 Volts (V) to about 4.8 V. An initial charging and discharging potential may be in a range of about 2.5 V to about 4.5 V, and in some embodiments, about 3.0 V to about 4.35 V.

The formation process is not particularly limited, and may be carried out with about a 0.05 C rate to about a 0.2 C rate. The C rate is a discharge rate of a cell, and is obtained by dividing a total capacity of the cell by a total discharge period of time, e.g., a C rate for a battery having a discharge capacity of 1.6 ampere-hours would be 1.6 amperes. In some embodiments, the charging and discharging may be repeated 1 to 3 times with 0.2 C and a cut-off voltage of about 3 V to about 4.35 V For example, the charging and discharging may be repeated twice. In some embodiments, a charging and discharging cycle may be carried out twice with about a 0.1 C rate and a cut-off voltage of about 3 V to about 4.3 V.

A composite separator according to an embodiment may have a coating film disposed on a surface of the composite separator, in which the coating film includes at least one selected from an inorganic particle and an organic-inorganic particle. The composite separator thus may have stability and air permeability. When the composite separator is used, the separator may be bonded the electrode without a separate separator bonding process. Accordingly, cell constituents, such as separators, may be prevented from being damaged by heat and pressure during an assembly process of a battery. Furthermore, since a separate bonding process is not needed, manufacturing time and cost may be reduced.

A lithium battery including an integrated electrode-composite separator assembly according to an embodiment may have improved bonding force of a composite separator to the electrode under bending or twisting. As described above, since there is no separate bonding process of a composite separator to electrodes, cell parts may be prevented from being damaged by heat or pressure that may occur during a heat and pressure bonding process, to provide reduced manufacturing time and cost. In addition, a bonding surface or a bonding pattern of an electrode-composite separator may be chosen, a pattern exterior may be used, and there is no limitation with regard to electrode-stacking and electrode-thickness, and thus, there is an advantage that an electrode or battery structure is not limited in design.

In a copolymer contained in a composite separator according to an embodiment, a glass transition temperature of a repeating unit represented by Formula 1 may be, for example, in a range of about 5° C. to about 70° C., about 10° C. to about 50° C., or about 15° C. to about 35° C.

The repeating unit represented by Formula 1 may be, for example, a vinyl acetate unit of Formula 1,

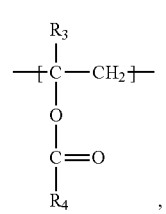

Formula 1 wherein, in Formula 1, $R_3$ may be hydrogen or a $C_1$-$C_5$ alkyl group, and $R_4$ may be a $C_1$-$C_{10}$ alkyl group.

An electrolyte-insoluble repeating unit of a copolymer in a coating film may be, e.g., a repeating unit resulting from polymerization of at least one selected from an acrylic acid ester monomer and a methacrylic acid ester monomer.

The acrylic acid ester monomer may be, e.g., an acrylic acid alkyl ester, such as methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, cyclohexyl acrylate, isopentyl acrylate, isooctyl acrylate, isobornyl acrylate, isodecyl acrylate, or lauryl acrylate; acrylic acid ester including an ether group, such as butoxyethyl acrylate, ethoxy diethylene glycol, acrylate, methoxy dipropylene glycol acrylate, methoxy polyethylene glycol acrylate, or phenoxyethyl acrylate; or acrylic acid ester including a hydroxyl group, such as 2-hydroxyethyl acrylate, 2-hydroxypropyl acrylate, or 2-hydroxy-3-phenoxypropyl acrylate.

The methacrylic acid ester monomer may be, e.g., methacrylic acid alkyl ester, such as methyl methacrylate, ethyl methacrylate, propyl methacrylate, isopropyl methacrylate, n-butyl methacrylate, isobutyl methacrylate, cyclohexyl methacrylate, 2-ethylhexyl methacrylate, isopentyl methacrylate, isooctyl methacrylate, isobornyl methacrylate, isodecyl methacrylate, or lauryl methacrylate; methacrylic acid ester including an ether group, such as butoxyethyl methacrylate, ethoxy diethylene glycol methacrylate, methoxy dipropylene glycol methacrylate, methoxy polyethylene glycol, methacrylate, or phenoxyethyl methacrylate; or methacrylic acid ester including a hydroxyl group, such as 2-hydroxyethyl methacrylate, 2-hydroxypropyl methacrylate, or 2-hydroxy-3-phenoxypropyl methacrylate.

At combination comprising least one of the foregoing monomers may be used.

The electrolyte-insoluble repeating unit may be, for example, i) a repeating unit represented by Formula 2 only; or ii) the repeating unit represented by Formula 2 and a repeating unit represented by Formula 3,

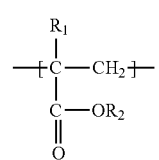

Formula 2 wherein, in Formula 2, $R_1$ may be hydrogen or a $C_1$-$C_5$ alkyl group, and $R_2$ may be a $C_2$-$C_{20}$ alkyl group, and

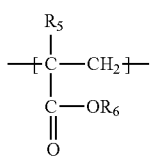

Formula 3 wherein, in Formula 3, $R_5$ may be hydrogen or a $C_1$-$C_5$ alkyl group, and $R_6$ may be a methyl group.

The repeating unit represented by Formula 1 may have a low glass transition temperature and be soluble in an electrolyte, thus having improved affinity to electrolyte. When a copolymer including the repeating unit represented by Formula 1 is used, bonding force of a composite separator to electrodes improves. When a composite separator containing a copolymer including the repeating unit represented by Formula 1 is used, a lithium battery may have improved electrochemical characteristics.

The repeating unit represented by Formula 2 may have a low glass transition temperature, for example below 80° C., and be insoluble in an electrolyte, thus having improved stability against the electrolyte. For example, the repeating unit represented by Formula 2 may have a glass transition temperature in a range of about 10° C. to about 50° C.

The repeating unit represented by Formula 2 may be at least one selected from an ethyl (meth)acrylate unit, propyl (meth)acrylate unit, butyl (meth)acrylate unit, pentyl (meth)acrylate unit, hexyl (meth)acrylate unit, and octyl (meth)acrylate unit. As used herein, "(meth)acrylate includes both acrylate and methacrylate.

The repeating unit represented by Formula 3 may have improved polymerization stability to form a target copolymer through a polymerization reaction together with the repeating unit represented by Formula 1 and the repeating unit represented by Formula 2. For example, the repeating unit represented by Formula 3 may be methyl methacrylate or methyl acrylate. For example, the repeating unit represented by Formula 3 may have a glass transition temperature in a range of about 50° C. to about 150° C., about 80° C. to about 120° C., or about 40° C. to about 100° C.

The amount of the repeating unit represented by Formula 2 in the copolymer may be in a range of about 0.01 mole to about 5.0 moles, about 0.1 mole to about 3 moles, or about 0.5 mole to about 2 moles, based on 1 mole of the repeating unit represented by Formula 1. The amount of the repeating unit represented by Formula 3 in the copolymer may be in a range of about 0.01 mole to about 3 moles, about 0.01 mole to about 1 mole, or about 0.01 mole to about 0.5 mole, based on 1 mole of the repeating unit represented by Formula 1.

When the amount of the repeating unit represented by Formula 2 and the repeating unit represented by Formula 3 are within these ranges, the copolymer including the repeating unit represented by Formula 2 and the repeating unit represented by Formula 3 may have a high glass transition temperature and improved stability and may provide the composite separator with improved mechanical characteristics, heat resistance, and wettability of an electrolyte.

The copolymer including a repeating unit of Formula 1, a repeating unit of Formula 2, and a repeating unit of Formula 3 having characteristics as described above may be a polymer with improved affinity to electrolyte and improved stability against heat.

For example, the copolymer may be a block copolymer, a graft copolymer, a random copolymer, or an alternating copolymer. By including a block copolymer, the composite separator may have improved electrochemical and mechanical characteristics.

According to another embodiment, a copolymer including the repeating unit represented by Formula 1, the repeating unit represented by Formula 2, and the repeating unit represented by Formula 3 may have a glass transition temperature in a range of about 10° C. to about 60° C., about 20° C. to about 50° C., or about 30° C. to about 40° C.

The copolymer may have a weight-average molecular weight of about 400,000 Daltons to about 1,000,000 Daltons, and in some embodiments, 500,000 Daltons to about 700,000 Daltons, or about 550,000 Daltons to about 650,000 Daltons. When the weight-average molecular weight of the copolymer is within these ranges, the composite separator may have improved durability.

The polymerization degree of the copolymer according to an embodiment may be in a range of about 1 to about 10,000, and in some embodiments, about 1 to about 5,000, or about 1 to about 3,000.

In some embodiments, the copolymer may be a copolymer represented by Formula 4a or Formula 4b,

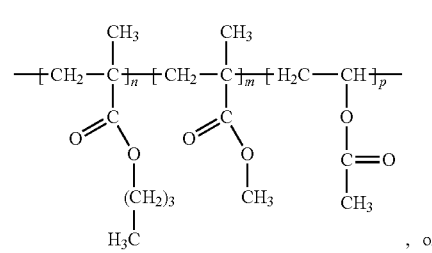

Formula 4a

, or

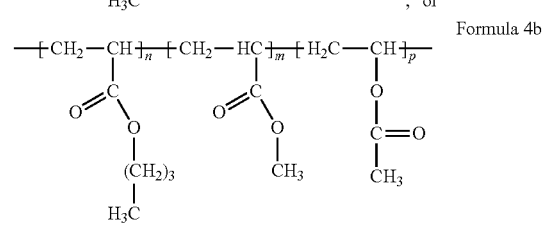

Formula 4b wherein, in Formulae 4a and Formula 4b, n, m, and p are mole fractions of the repeating units represented by Formulae 1, 2, and 3, respectively, wherein n, m, and p may be each independently in a range of about 0.01 to about 0.99, and wherein a sum of n, m, and p is 1.

According to another embodiment, n may be in a range of about 0.2 to about 0.8, or about 0.3 to about 0.7, and in some embodiments, about 0.4, and m may be in a range of about 0.01 to about 1, about 0.1 to about 0.5, or about 0.1 to about 0.3, and in some embodiments, about 0.1, and p may be in a range of about 0.01 to about 0.1 to about 0.7, and in some embodiments about 0.5.

The copolymer represented by Formula 4a or Formula 4b may have a viscosity of about 100 cP to about 2,000 cP, about 300 centipoise (cP) to about 1,000 cP, or about 400 cP to about 800 cP, at a temperature of 25° C., and measured as a 10 weight percent (wt %) solution thereof dissolved in acetone. The copolymer represented by Formula 4a (wherein n is 0.4, m is 0.1, and p is 0.5) may have a glass transition temperature in a range of about 30° C. to about 42° C., about 34° C. to about 40° C., or about 36° C. to about 38° C.

A composite separator according to an embodiment may include at least one selected from an inorganic particle and an organic-inorganic particle as well as a copolymer.

When the composite separator includes at least one selected from an inorganic particle and an organic-inorganic particle, the composite separator may have air permeability with improved thermal and mechanical characteristics.

Examples of the at least one selected from an inorganic particle and an organic-inorganic particle may be at least one selected from $Al_2O_3$, $SiO_2$, $B_2O_3$, $Ga_2O_3$, $TiO_2$, $SnO_2$, $BaTiO_3$, $Pb(Zr_aTi_{1-a})O_3$ wherein $0 \leq a \leq 1$, $Pb_{1-x}La_xZr_yO_3$ wherein $0<x<1$ and $0<y<1$, $Pb(Mg_3Nb_{2/3})_3$, $PbTiO_3$, $HfO_2$, $SrTiO_3$, $SnO_2$, $CeO_2$, MgO, NiO, CaO, ZnO, $Y_2O_3$, SiC, $ZrO_2$, a boron silicate, $BaSO_4$, a nanoclay, fumed silica, fumed alumina, graphite oxide, graphene oxide, and a metal-organic framework (MOF).

The MOF as organic-inorganic particles may be a porous crystalline compound in which a Group 2 to Group 15 metal ion or a Group 2 to Group 15 metal ionic cluster is chemically bound to an organic ligand. The organic ligand refers to an organic group that may form an organic bond, such as a coordinate bond, an ionic bond, or a covalent bond. For example, an organic group having at least two binding sites for such metal ions as described above may form a stable structure through binding with the metal ions.

The Group 2 to Group 5 metal ion may be at least one selected from cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), and bismuth (Bi). The organic ligand may be a group derived from at least one of compounds selected from an aromatic dicarboxylic acid, an aromatic tricarboxylic acid, an imidazole compound, tetrazole, 1,2,3-triazole, 1,2,4-triazole, pyrazole, an aromatic sulfonic acid, an aromatic phosphoric acid, an aromatic sulfinic acid, an aromatic phosphinic acid, bipyridine, and compounds having at least one functional group selected from an amino group, an imino group, an amide group, a dithio carboxylic acid group ($—CS_2H$), a dithio carboxylate group ($—CS_2—$), a pyridine group, and a pyrazine group.

Examples of the aromatic dicarboxylic acid and the aromatic tricarboxylic acid may include benzene dicarboxylic acid, benzene tricarboxylic acid, biphenyl dicarboxylic acid, and terphenyl-dicarboxylic acid.

The organic ligand may be, for example, a group originating from compounds represented by Formulae 5, Formula 5

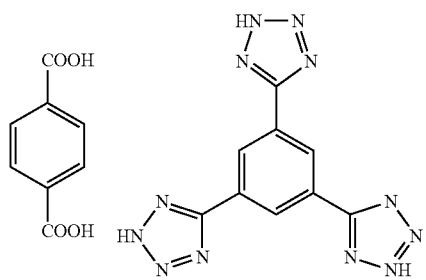

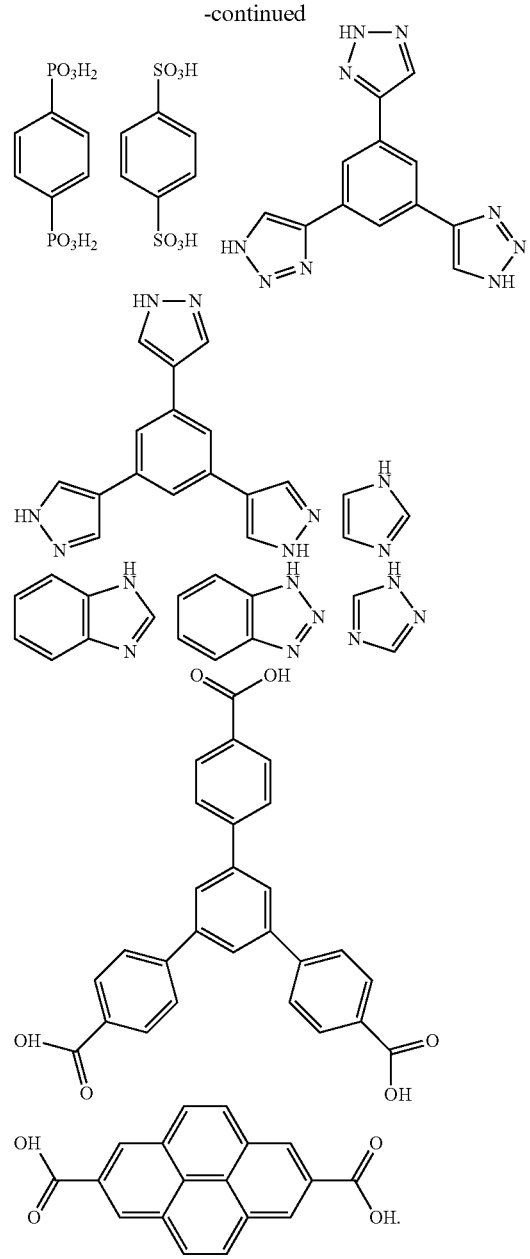

The MOF may be, for example, $Ti_8O_8(OH)_4[O_2C—C_6H_4—CO_2]_6$, $Cu(bpy)(H_2O)_2(BF_4)_2(bpy)$ wherein bpy is 4,4'-bipyridine, $Zn_4O(O_2C—C_6H_4—CO_2)_3$ (Zn-terephthalic acid-MOF, Zn-MOF), or $Al(OH)\{O_2C—C_6H_4—CO_2\}$.

For example, the cage-structured silsesquioxane may be a polyhedral oligomeric silsesquioxane (POSS). The number of silicon atoms in the POSS may be about 8 or fewer, and in some embodiments, 6 or 8. The cage-structured silsesquioxane may be a compound represented by Formula 6, $$Si_kO_{1.5k}(R^1)_a(R^2)_b(R^3)_c \quad \text{Formula 6}$$

wherein in Formula 6, $R^1$, $R^2$, and $R^3$ may be each independently hydrogen, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_4$-$C_{30}$ carbocyclic group, or a silicon-containing functional group.

In Formula 6, k=a+b+c and 6≤k≤20.

The cage-structured silsesquioxane may be a compound represented by Formula 7 or a compound represented by Formula 8,

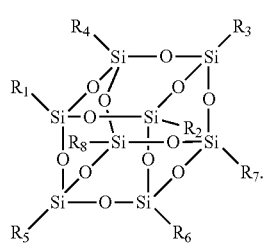

Formula 7

In Formula 7, $R_1$ to $R_8$ may be each independently hydrogen, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_4$-$C_{30}$ carbocyclic group, or a silicon-containing functional group.

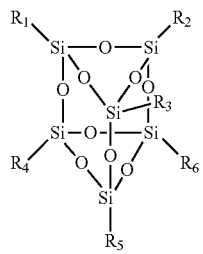

Formula 8

In Formula 8, $R_1$ to $R_6$ may be each independently hydrogen, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkenyl group, a substituted or unsubstituted $C_2$-$C_{30}$ group, a substituted or unsubstituted $C_6$-$C_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_4$-$C_{30}$ carbocyclic group, or a silicon-containing functional group.

In some embodiments, $R_1$ to $R_8$ in Formula 7 and $R_1$ to $R_6$ in Formula 8 may be an isobutyl group. For example, the cage-structured silsesquioxane may be octaisobutyl-t8-silsesquioxane.

In some embodiments, the inorganic particle may be $Al_2O_3$ that is not reactive with lithium.

The at least one selected from an inorganic particle and an organic-inorganic particle may have an average particle diameter of about 2 micrometers (μm) or less, and in some embodiments, about 500 nanometers (nm) or less, and in some embodiments, about 100 nm or less. For example, the at least one selected from an inorganic particle and an organic-inorganic particle may have a particle diameter of about 1 nm to about 100 nm, and in some embodiments, about 10 nm to about 100 nm, and in some other embodiments, about 30 nm to about 70 nm. When the at least one selected from an inorganic particle and an organic-inorganic particle has a particle diameter within these ranges, the composite separator may have improved film formability and mechanical properties without decrease in ionic conductivity.

The amount of the at least one selected from an inorganic particle and an organic-inorganic particle may be in a range of about 100 parts by weight to about 2,000 parts by weight, and in some embodiments, about 300 parts by weight to about 1000 parts by weight, or about 500 parts by weight to about 800 parts by weight, based on 100 parts by weight of the copolymer. When the amount of the at least one selected from an inorganic particle and an organic-inorganic particle is within these ranges, the composite separator may have improved flexibility without breakage.

The thickness of the coating film in the composite separator may be in a range of about 1 μm to about 5 μm, and the thickness of the composite separator may be in a range of about 5 μm to about 30 μm, and in some embodiments, about 8 μm to about 20 μm, or about 10 μm to about 15 μm. When the thickness of the composite separator is within these ranges, a lithium battery including the composite separator may have improved electrochemical characteristics without deterioration in safety.

In some embodiments, the composite separator of the electrode-composite separator assembly may include $Al_2O_3$ and a copolymer represented by Formula 4a,

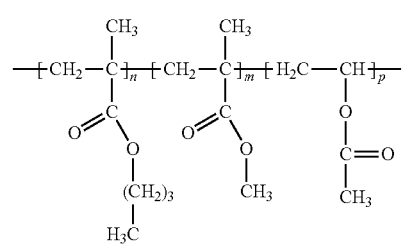

Formula 4a wherein, in Formula 4a, n, m, and p are mole fractions of the repeating units represented by Formulae 1, 2, and 3, respectively, wherein n, m, and p may be each independently in a range of about 0.01 to about 0.99, and wherein a sum of n, m, and p is 1. For example, n may be 0.4, n may be 0.1, and p may be 0.5.

A composite separator including a copolymer including the repeating unit represented by Formula 1, the repeating unit represented by Formula 2, and the repeating unit represented by Formula 3 and at least one selected from an inorganic particle and an organic-inorganic particle may be undergo a charging and discharging process to thereby manufacture an electrode-composite separator assembly.

For example, a composite separator membrane composition may be coated on a positive electrode.

The composite separator may have improved affinity to electrolyte, electrolyte impregnating ability, electrolyte leakage preventing ability, and lithium ionic conductivity.

A separator used in an electrode-composite separator assembly may be any suitable separator for a lithium battery. For example, the separator may be a polyolefin-based porous membrane or a non-woven fabric, but embodiments are not limited thereto. For example, the polyolefin-based porous membrane may be a polymer membrane including a polyolefin polymer, e.g., at least one selected from a polyethylene, such as a high-density polyethylene, a low-density polyethylene, a linear low-density polyethylene, or a ultrahigh molecular weight polyethylene, a polypropylene, a polybutylene, and a polypentene. The non-woven fabric may be a polyolefin non-woven fabric, or a non-woven fabric including a polymer, e.g., at least one selected from polyethylene terephthalate, polybutylene terephthalate, polyester, polyacetal, polyamide, polycarbonate, polyimide, polyetheretherketone, polyethersulfone, polyphenylene oxide, polyphenylene sulfide, and polyethylene naphthalene.

The non-woven fabric may be a spun-bond non-woven fabric or melt-blown non-woven fabric made of long fibers. The separator may have any suitable thickness, for example, about 1 μm to about 100 μm, about 5 μm to about 50 μm, or about 10 μm to about 30 μm. The separator may have any suitable pore size, e.g., about 0.5 nm to about 500 nm, about 1 nm to about 200 nm, or about 5 nm to about 100 nm, and any suitable porosity, e.g., about 5% to about 99%, about 10% to about 95%, or about 20% to about 90%.

In some embodiments, the composite separator of the electrode-composite separator assembly may further include a binder, such as a binder which is used in manufacturing a positive electrode and a negative electrode. For example, the binder may be at least one selected from styrene butadiene rubber, carboxymethyl cellulose (CMC), polyvinyl alcohol, starch, hydroxypropyl cellulose, reproduced cellulose, polyvinylpyrrolidone, tetrafluoroethylene, polyethylene, polypropylene, ethylene propylene diene terpolymer (EPDM), sulfonated EPDM, and fluorocarbon rubber.

FIG. 1A illustrates an embodiment of a schematic view of a lithium battery.

Referring to FIG. 1A, a composite separator 10 is disposed between a positive electrode 11 and a negative electrode 14. The composite separator 10 may include a separator 13 and a coating film 12 disposed on a surface of the separator 13. The coating film 12 is disposed on the positive electrode 11.

In an embodiment the coating film 12 is formed on the separator 13, however the coating film 12 may be formed on another surface of the separator 13. When such a lithium battery is used as a flexible battery, a lithium battery including the composite separator 10 shown in FIG. 1A may have improved durability, stability, and flexibility against bending and/or twisting, as compared with a lithium battery including a composite separator in which coating films are formed on both surfaces of a separator.

Figure 1B:
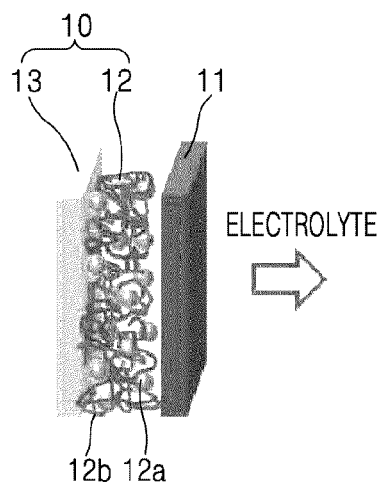
FIG. 1B illustrates an embodiment of an electrode-composite separator assembly before addition of electrolyte.
Figure 1C:
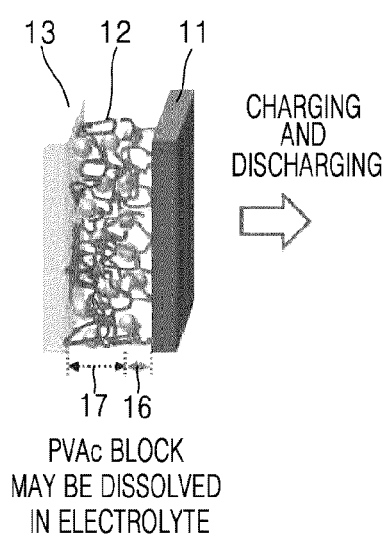
FIG. 1C illustrates the embodiment of FIG. 1B, after addition of electrolyte and before charging and discharging.
Figure 1D:
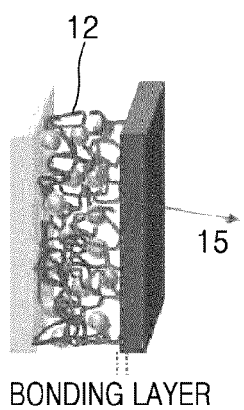
FIG. 1D illustrates the embodiment of FIG. 1C, after charging and discharging; an electrode-composite separator assembly before addition of electrolyte.
Figure 1E:
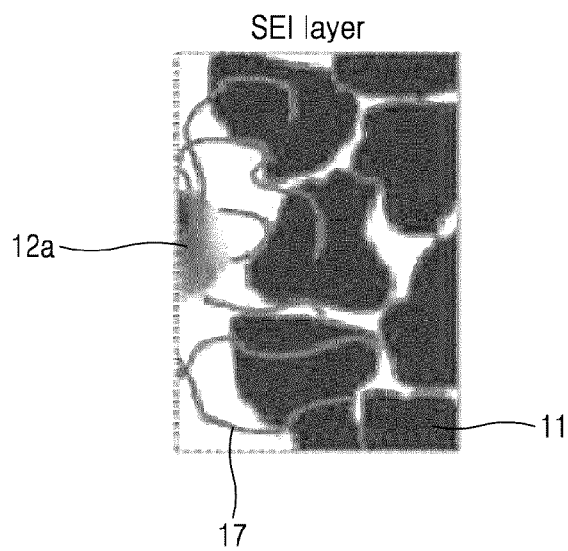
FIG. 1E is an enlarged view illustrating an SEI layer.
Figure 1F:
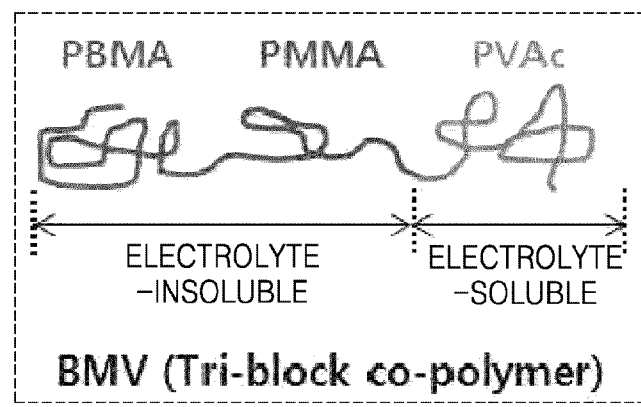
FIG. 1F is a schematic view of the tri-block copolymer illustrating an electrolyte-insoluble region including polybutyl methacrylate and polymethyl methacrylate, and an electrolyte soluble region including polyvinyl acetate.

FIGS. 1B to 1D illustrate an embodiment of an action mechanism of an electrode-composite separator assembly in which FIG. 1B illustrates an embodiment of an electrode-composite separator assembly before addition of electrolyte, FIG. 1C illustrates the embodiment of FIG. 1B after addition of electrolyte and before charging and discharging, and FIG. 1D illustrates the embodiment of FIG. 1C after charging and discharging. FIG. 1E is an enlarged view illustrating an SEI layer. FIG. 1F is a schematic view of the tri-block copolymer illustrating an electrolyte-insoluble region including polybutyl methacrylate and polymethyl methacrylate, and an electrolyte soluble region including polyvinyl acetate.

The coating film 12 of the composite separator 10 may include, for example, a block copolymer 12b represented by Formula 4a or Formula 4b and alumina 12a,

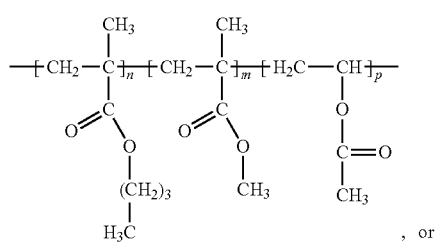

Formula 4a

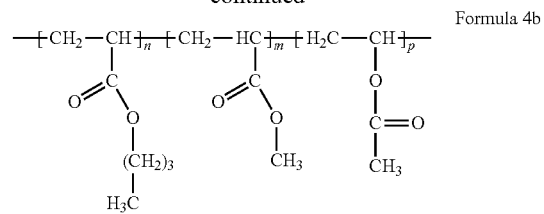

Formula 4b wherein, in Formula 4a and Formula 4b, n, m, and p are mole fractions of the repeating units represented by Formulae 1, 2, and 3, respectively, wherein n, m, and p may be each independently in a range of about 0.01 to about 0.99, and wherein a sum of n, m, and p is 1.

Referring to FIG. 1B, the coating film 12 of the separator 13 may be disposed on the positive electrode 11. When an electrolyte is provided to such an electrode-composite separator assembly, a polyvinyl acetate (PVAc) block 16, which is electrolyte-soluble and included in a block copolymer in the coating film, may be dissolved in an electrolyte to be disposed close to the positive electrode 11, and polymethyl methacrylate (PMMA) block 17, which is electrolyte-insoluble, may be disposed far from the positive electrode 11. When such an electrode-composite separator assembly undergoes a charging and discharging process, the polyvinyl acetate block 16, which may be in touch with a surface of the positive electrode 11 and adjacent the electrolyte-insoluble portion 17 of the block copolymer, may participate in a side reaction with an electrolyte, thus forming an SEI layer 15 on the positive electrode 11. FIG. 1C shows an enlarged view of the electrode having the SEI layer 15. The SEI layer 15 may include a carbonate-based compound, a polycarbonate-based compound, polyether, $Li_xPF_y$, and $Li_xPF_yO_z$ of the electrolyte. The block copolymer is further illustrated in FIG. 1D, which illustrates the electrolyte insoluble and the electrolyte soluble portions of the block copolymer, and FIG. 1F, which is an enlarged view of the SEI layer.

Hereinafter, a method of manufacturing an electrode-composite separator assembly according to an embodiment will be further disclosed.

First, at least one selected from an inorganic particle and an organic-inorganic particle and a copolymer including a repeating unit represented by Formula 1, a repeating unit represented by Formula 2, and a repeating unit represented by Formula 3 may be mixed with a solvent to obtain a composite separator composition.

Next, the composite separator composition may be coated on an electrode and then dried to form an electrode-composite separator assembly.

For example, the coating of the composite separator composition may be performed using spin coating, roll coating, curtain coating, extrusion, screen printing, ink-jet printing, a doctor blading, or the like.

The drying may be performed at a temperature in a range of about 25° C. to about 130° C., and in some embodiments, about 30° C. to about 100° C., or about 40° C. to about 90° C. The drying may be performed under vacuum conditions.

The solvent may be any suitable organic solvent available in the art. For example, the organic solvent may be at least one selected from acetone, tetrahydrofuran, N-methylpyrrolidone, acetonitrile, benzonitrile, 2-methyl tetrahydrofuran, γ-butyrolactone, dioxolane, 4-methyldioxolane, N,N-dimethylformamide, N,N-dimethyl acetamide, dimethyl sulfoxide, dioxane, 1,2-dimethoxyethane, 1,2-diethoxyethane, sulfolane, dichloroethane, chlorobenzene, nitrobenzene, diethylene glycol, and dimethyl ether. The amount of the organic solvent may be in a range of about 50 parts to about 6,000 parts by weight, about 100 parts to about 3,000 parts by weight, or about 200 parts to about 1,000 parts by weight, based on 100 parts by weight, based on a total weight of the at least one selected from an inorganic particle and an organic-inorganic particle and the copolymer.

The composite separator composition may be prepared by mixing all of the ingredients at the same time. In some other embodiments, the composite separator composition may be prepared by mixing the at least one selected from an inorganic particle and an organic-inorganic particle with a solvent and a dispersing agent to obtain a dispersion of the at least one selected from an inorganic particle and an organic-inorganic particle, and mixing the dispersion with a copolymer. The copolymer may be dispersed or dissolved in a solvent to prepare a dispersion or solution thereof. This mixing process may facilitate dispersing and mixing the ingredients in the composite separator composition.

The dispersion of the at least one selected from an inorganic particle and an organic-inorganic particle may be prepared by milling. The milling may control the average particle diameter of the inorganic particle and the organic-inorganic particle to be about 0.5 µm or less, so that the composite separator composition may have homogeneous composition. When using the composite separator having uniform composition, the composite separator may have improved mechanical characteristics.

For example, the dispersing agent may be a compound or polymer including a polar group having affinity, such as a carboxyl group, a hydroxyl group, and an acid ester. Examples of the dispersing agent may include an acid-containing compound, such as a phosphoric acid ester, an acid group-containing copolymerization product, a hydroxyl group-containing polycarboxylic acid ester, polysiloxane, a salt of a long-chain polyaminoamide, and an acid ester. Any suitable dispersing agent known in the art may be used. For example, the dispersing agent may be Triton X-100, acetic acid, cetyltrimethyl ammonium bromide (CTAB), isopropyltris(N-aminoethylaminoethyl)titanate (INAAT, available from Ajimoto Fine-Techno Co., Inc.), 3-aminopropyltriethoxy-silane (APTS, available from Aldrich, 99%), polyvinyl pyrrolidone (PVP), or poly(4-vinylphenol), which may be used alone or in combination of at least two thereof. The amount of the dispersing agent may be in a range of about 0.01 part by weight to about 100 parts by weight, about 0.01 part by weight to about 10 parts by weight, or about 0.1 part by weight to about 5 parts by weight, based on 100 parts by weight of the total weight of the at least one selected from an inorganic particle and an organic-inorganic particle.

According to an aspect of another embodiment, a lithium battery includes an electrode-composite separator assembly.

An electrode of the electrode-composite separator assembly may be a positive electrode.

In some embodiments, the lithium battery may further include a solid electrolyte including at least one selected from an inorganic particle and an organic-inorganic particle, and a lithium ionic conductor.

The lithium ionic conductor may be at least one selected from $Li_3N$, a lithium super ionic conductor such as $Li_{3y}PO_{4-x}N_x$ wherein $0<y<3$ and $0<x<4$, a thio-lithium super ionic conductor, $Li_{3.25}Ge_{0.25}P_{0.75}S_4$, $Li_2S$, $Li_2S—P_2S_5$, $Li_2S—SiS_2$, $Li_2S—GeS_2$, $Li_2S—B_2S_5$, $Li_2S—Al_2S_5$, $Li_2O—Al_2O_3—TiO_2—P_2O_5$, a lithium lanthanum titanate, $Li_{0.34}La_{0.51}TiO_{2.94}$, and a lithium titanium aluminum phosphate, and $Li_{1+x}Ti_{2-x}Al(PO_4)_3$ wherein $0 \le x \le 0.4$.

In some embodiments, the lithium battery may further include a liquid electrolyte. In the electrode-composite separator assembly of the lithium battery, the copolymer may not be soluble in the liquid electrolyte.

In some embodiments, the lithium battery may include a gel electrolyte, instead of the solid electrolyte. In some other embodiments, the lithium battery may include both a solid electrolyte and a gel electrolyte.

The gel electrolyte may be any suitable electrolyte in gel-type known in the art. The gel electrolyte may include, for example, a polymer and an ionic liquid polymer. The polymer may be, for example, a solid graft (block) copolymer electrolyte.

The solid electrolyte may be an organic solid electrolyte or an inorganic solid electrolyte.

Examples of the organic solid electrolyte may include polyethylene derivatives, polyethylene oxide derivatives, polypropylene oxide derivatives, phosphoric acid ester polymers, poly(L-lysine), polyester sulfide, polyvinyl alcohol, polyvinylidene fluoride, and polymers containing ionic dissociation groups.

Examples of the inorganic solid electrolyte may include at least one selected from $Li_3N$, $LiI$, $Li_5NI_2$, $Li_3N—LiI—LiOH$, $Li_2SiS_3$, $Li_4SiO_4$, $Li_4SiO_4—LiI—LiOH$, $Li_3PO_4—Li_2S—SiS_2$, $Cu_3N$, $LiPON$, $Li_2S$ $GeS_2$ $Ga_2S_3$, $Li_2O$ $11Al_2O_3$, $(Na,Li)_{1+x}Ti_{2-x}Al_x(PO_4)_3$ $0.1 \le x \le 0.9$, $Li_{1+x}Hf_{2-x}Al_x(PO_4)_3$ wherein $0.1 \le x \le 0.9$, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-Silicate, $Li_{0.3}La_{0.5}TiO_3$, $Na_5MSi_4O_{12}$ wherein M may be a rare earth element, such as, Nd, Gd, or Dy, $Li_5ZrP_3O_{12}$, $Li_5TiP_3O_{12}$, $Li_3Fe_2P_3O_{12}$, $Li_4NbP_3O_{12}$, $Li_{1+x}(M, Al, Ga)_x(Ge_{1-y}Ti_y)_{2-x}(PO_4)_3$ wherein $0 \le x \le 0.8$, $0 \le y \le 1.0$, and M may be Nd, Sm, Eu, Gd, Tb, Dy, Ho, Er, Tm or Yb, $Li_{1+x+y}Q_xTi_{2-x}Si_yP_{3-y}O_{12}$ wherein $0 < x \le 0.4$, $0 < y \le 0.6$, and Q may be Al or Ga, $Li_6BaLa_2Ta_2O_{12}$, $Li_7La_3Zr_2O_{12}$, $Li_5La_3Nb_2O_{12}$, $Li_5La_3M_2O_{12}$ wherein M may be Nb or Ta, and $Li_{7+x}A_xLa_{3-x}Zr_2O_{12}$ wherein $0 < x < 3$ and A may be Zn.

In some embodiments, the positive electrode of the lithium battery may be a porous positive electrode. The porous positive electrode may be a positive electrode including pores, or any suitable positive electrode that allows permeation of liquid electrolyte thereinto by capillary action.

For example, the porous positive electrode may be a positive electrode that may be obtained by coating a positive active material composition including a positive active material, a conductive agent, a binder, and a solvent, and drying the resulting structure. The resulting positive electrode may include pores among particles of the positive active material. The porous positive electrode may be impregnated with liquid electrolyte.

In some embodiments, the positive electrode may further include a liquid electrolyte, a gel electrolyte, a solid electrolyte, or the like. The liquid electrolyte, the gel electrolyte, and the solid electrolyte may be any suitable electrolytes available for lithium batteries in the art that do not react adversely with the positive active material, and thus prevent deterioration of the positive active material during charging and discharging.

In an embodiment, the method comprises disposing a composite separator on a cathode or an anode, wherein the composite separator comprises
   a separator, and
   a coating film disposed on a surface of the separator, wherein the coating film comprises
     a copolymer comprising an electrolyte-insoluble repeating unit and a repeating unit represented by Formula 1, and at least one selected from an inorganic particle and an organic-inorganic particle, wherein the electrode-composite separator assembly does not have an exothermic peak between about 400° C. to about 480° C. when analyzed by differential scanning calorimetry, and wherein Formula 1 is

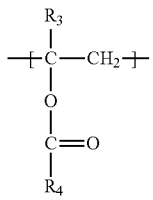

Formula 1 wherein, in Formula 1, $R_3$ is hydrogen or a $C_1$-$C_5$ alkyl group, and $R_4$ is a $C_1$-$C_{10}$ alkyl group to form a first subassembly; and then disposing the first subassembly on the other of the cathode for the anode to form a second subassembly;

disposing the second subassembly in a case;

adding an electrolyte to the cell case to form a lithium battery; and charging the lithium battery to form the electro-composite separator assembly.

The method may further comprise discharging the lithium battery, for example to further electrochemically bond the electro-composite separator assembly.

Hereinafter, embodiments of a method of manufacturing a lithium battery according to an embodiment will be further disclosed.

A positive active material for a positive electrode may include at least one selected from lithium cobalt oxide, lithium nickel cobalt manganese oxide, lithium nickel cobalt aluminum oxide, lithium iron phosphorous oxide, and lithium manganese oxide, but embodiments are not limited thereto. Any suitable positive active material available in the art may be used.

For example, the positive active material may be a compound represented by one of the following formulae: $Li_aA_{1-b}B'_bD'_2$ wherein $0.90 \leq a \leq 1.8$ and $0 \leq b \leq 0.5$; $Li_aE_{1-b}B'_bO_{2-c}D'_c$ wherein $0.90 \leq a \leq 1.8$, $0 \leq b \leq 0.5$, and $0 \leq c \leq 0.05$; $LiE_{2-b}B'_bO_{4-c}D'_c$ wherein $0 \leq b \leq 0.5$ and $0 \leq c \leq 0.05$; $Li_aNi_{1-b-c}Co_bB'_cD'_\alpha$ wherein $0.90 \leq a \leq 1.8$, $0 \leq b \leq 0.05$, $0 \leq c \leq 0.05$ and $0 \leq \alpha \leq 2$; $Li_aNi_{1-b-c}Co_bB'_cO_{2-\alpha}F'_\alpha$ wherein $0.90 \leq a \leq 1.8$, $0 \leq b \leq 0.05$, $0 \leq c \leq 0.05$, and $0 \leq \alpha \leq 2$; $LiaNi_{1-b-c}Mn_bB'_cD'_\alpha$ wherein $0.90 \leq a \leq 1.8$, $0 \leq b \leq 0.05$, $0 \leq c \leq 0.05$, and $0 < \alpha \leq 2$; $Li_aNi_{1-b-c}Mn_bB'_cO_{2-\alpha}F'_\alpha$ wherein $0.90 \leq a \leq 1.8$, $0 \leq b \leq 0.5$, $0 \leq c \leq 0.05$, and $0 < \alpha < 2$; $Li_aNi_bE_cG_dO_2$ wherein $0.90 \leq a \leq 1.8$, $0 \leq b \leq 0.9$, $0 \leq c \leq 0.5$, and $0.001 \leq d \leq 0.1$; $Li_aNi_bCo_cMn_dG_eO_2$ wherein $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ wherein $0.90 \leq a \leq 1.8$ and $0.001 \leq b \leq 0.1$; $Li_aMn_2G_bO_4$ wherein $0.90 \leq a \leq 1.8$ and $0.001 \leq b \leq 0.1$; $QO_2$; $QS_2$; $LiQS_2$; $V_2O_5$; $LiV_2O_5$; $LiV_2O_5$; $LiNiVO_4$; $Li_{(3-f)}J_2(PO_4)_3$ wherein $0 \leq f \leq 2$; $Li_{(3-f)}Fe_2(PO_4)_3$ wherein $0 \leq f \leq 2$; and $LiFePO_4$.

In the formulae above, A is nickel (Ni), cobalt (Co), manganese (Mn), or a combination thereof; B' is aluminum (Al), nickel (Ni), cobalt (Co), manganese (Mn), chromium (Cr), iron (Fe), magnesium (Mg), strontium (Sr), vanadium (V), a rare earth element, or a combination thereof; D is oxygen (O), fluorine (F), sulfur (S), phosphorus (P), or a combination thereof; E is cobalt (Co), manganese (Mn), or a combination thereof; F' is fluorine (F), sulfur (S), phosphorus (P), or a combination thereof; G is aluminum (Al), chromium (Cr), manganese (Mn), iron (Fe), magnesium (Mg), lanthanum (LA, cerium (Ce), strontium (Sr), vanadium (V), or a combination thereof; Q is titanium (Ti), molybdenum (Mo), manganese (Mn), or a combination thereof; I' is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

For example, the positive active material may be a compound represented by Formula 9, a compound represented by Formula 10, or a compound represented by Formula 11:

Formula 9 wherein, in Formula 9, $0.90 \leq a \leq 1.8$, $0 \leq b \leq 0.9$, $0 \leq c \leq 0.5$, and $0 \leq d \leq 0.5$.

Formula 10

Formula 11 wherein, in Formula 11, M may be Mn, Fe, Co, or Ni.

The positive electrode of the lithium metal battery may be manufactured as follows.

A positive active material, a binder, and a solvent are mixed to prepare a positive active material layer composition. A conductive agent may be further added to the positive active material layer composition.

The positive active material layer composition may be directly coated on a metallic current collector and dried to prepare a positive electrode. Alternatively, the positive active material layer composition may be cast on a support to form a positive active material layer, which may then be separated from the support and laminated on a metallic current collector to form a positive electrode.

The binder may assist binding of the positive active material to the conductive agent, and binding to the current collector. The amount of the binder may be in the range of about 1 part by weight to about 50 parts by weight based on 100 parts by weight of the positive active material. Examples of the binder include polyvinylidene fluoride, polyvinyl alcohol, carboxymethyl cellulose (CMC), starch, hydroxypropyl cellulose, reproduced cellulose, polyvinylpyrrolidone, tetrafluoroethylene, polyethylene, polypropylene, EPDM, sulfonated EPDM, styrene butylene rubber, fluorine rubber, and polyamide-imide (PAI). The amount of the binder may be in a range of about 2 parts by weight to about 25 parts by weight, or about 2 parts by weight to about 5 parts by weight, based on 100 parts by weight of the positive active material. When the amount of the binder is within this range, a binding force of the positive active material layer to the current collector may be satisfactory.

The conductive agent may be any suitable material that has conductivity while not generating an undesirable chemical change in the battery. Examples of the conductive agent include graphite, such as natural graphite or artificial graphite; a carbon-based material, such as carbon black, acetylene black, Ketjen black, channel black, furnace black, lamp black, or summer black; conductive fibers, such as carbon fibers or metal fibers; a metal powder of a fluorinated carbon, aluminum, or nickel; conductive whiskers, such as zinc oxide or potassium titanate; a conductive metal oxide, such as titanium oxide; and a conductive material, such as a polyphenylene derivative.

The amount of the conductive agent may be in a range of about 0.1 part by weight to about 10 parts by weight, about 1 part by weight to about 10 parts by weight, or about 1 part by weight to about 5 parts by weight, based on 100 parts by weight of the total weight of the positive electrode active material. When the amount of the conductive agent is within this range, conductivity characteristics finally obtained may be improved.

A non-limiting example of the solvent may be N-methylpyrrolidone.

The amount of the solvent may be in a range of about 10 parts by weight to about 5,000 parts by weight, about 100 parts by weight to about 2,000 parts by weight, or about 200 parts by weight to about 1,000 parts by weight, based on 100 parts by weight of the positive active material. When the amount of the solvent is within this range, the process for forming the positive active material layer may be performed with improved efficiency.

The negative electrode of the lithium battery may be manufactured in substantially the same manner as the positive electrode, except for using a negative active material instead of the positive active material.

The negative active material may comprise at least one selected from a carbonaceous material, silicon, a silicon oxide, a silicon-based alloy, a silicon-carbonaceous material composite, tin, a tin-based alloy, a tin-carbon composite, and a metal oxide.

The carbonaceous material may comprise crystalline carbon, amorphous carbon, or a mixture thereof. The crystalline carbon may be graphite, such as natural graphite or artificial graphite that is in amorphous, plate, flake, spherical or fibrous form. The amorphous carbon may comprise a soft carbon (carbon sintered at low temperatures), hard carbon, meso-phase pitch carbides, sintered cokes, graphene, carbon black, fullerene soot, carbon nanotubes, and carbon fibers. Any suitable material available in the art may be used.

The negative active material may be selected from Si, SiOx wherein $0<x<2$, for example, $0.5<x<1.5$, Sn, $SnO_2$, a silicon-containing metal alloy, and a mixture thereof. The silicon-containing metal alloy may include at least one metal selected from Al, Sn, Ag, Fe, Bi, Mg, Zn, in, Ge, Pb, and Ti.

The negative active material may include a metal or metalloid alloyable with lithium, an alloy thereof, or an oxide thereof. Examples of the metal or metalloid alloyable with lithium or the oxide thereof may include Si, Sn, Al, Ge, Pb, Bi, Sb, a Si-A alloy (wherein A may be an alkali metal, an alkaline earth metal, a Group 13 and 14 element, a transition metal, a rare earth element, or a combination thereof except for Si), a Sn-A alloy (wherein A may be an alkali metal, an alkaline earth metal, a Group 13 and 14 element, a transition metal, a rare earth element, or a combination thereof except for Sn), and $MnO_x$ wherein $0<x\leq2$. A may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof. In some embodiments, an oxide of the metal or metalloid alloyable with lithium may be a lithium titanium oxide, a vanadium oxide, a lithium vanadium oxide, $SnO_2$, or $SiO_x$ wherein $0<x<2$.

A composite separator composition containing at least one selected from an inorganic particle and an organic-inorganic particle and a copolymer including a repeating unit represented by Formula 1, a repeating unit represented by Formula 2, and a repeating unit represented by Formula 3 may be coated on a separator and then dried to prepare an electrode-composite separator assembly precursor. The electrode composite separator precursor may undergo a subsequent charging and discharging process to be electrochemically bonded, thus forming an electrode-composite separator assembly.

The negative electrode, the electrode-composite separator assembly precursor, and the positive electrode may be assembled, and an electrolyte may be added thereto, thus completing the manufacture of a lithium battery.

The lithium battery may undergo a charging and discharging process, thus electrochemically bonding a composite separator to electrodes in the electrode-composite separator assembly precursor.

The charging and discharging process may be, for example, charging and discharging 1 to 3 times with a current of about a 0.5 C rate to about a 0.2 C rate and a cut-off voltage of about 3 V to about 4.35 V, and in some embodiments, charging and discharging twice with a current of about a 0.1 C rate and a cut-off voltage of about 3.0 V to about 4.35 V.

In some embodiments, the electrolyte may include a lithium salt and an organic solvent.

Examples of the organic solvent may include a carbonate compound, a glyme compound, and a dioxolane compound. For example, the carbonate compound may include at least one selected from ethylene carbonate, propylene carbonate, dimethyl carbonate, fluoroethylene carbonate, ethyl carbonate, and ethylmethyl carbonate. The glyme compound may be, for example, at least one selected from poly(ethylene glycol)dimethyl ether, tetra(ethylene glycol)dimethyl ether, tri(ethylene glycol)dimethyl ether, poly(ethylene glycol)dilaurate, poly(ethylene glycol) monoacrylate, and poly(ethylene glycol)diacrylate.

The dioxolane compound may be, for example, at least one selected from 3-dioxolane, 4,5-diethyl-dioxolane, 4,5-dimethyl-dioxolane, 4-methyl-1,3-dioxolane, and 4-ethyl-1,3-dioxolane. Examples of the organic solvent may include 2,2-dimethoxy-2-phenyl acetophenone, 1,2-dimethoxyethane (DME), 1,2-diethoxy ethane, tetrahydrofuran, gamma-butyrolactone, and 1,1,2,2-tetrafluoroethyl 2,2,3,3-tetrafluoropropyl ether.

For example, the organic solvent may include at least one selected from propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, fluoroethylene carbonate, benzonitrile, acetonitrile, tetrahydrofuran, 2-methyltetrahydrofuran, γ-butyrolactone, dioxolane, 4-methyl dioxolane, N,N-dimethyl formamide, N,N-dimethyl acetamide, dimethyl sulfoxide, dioxane, sulfolane, dichloroethane, chlorobenzene, nitrobenzene, diethylene glycol, dimethyl ether, 1,1,2,2-tetrafluoroethyl 2,2,3,3-tetrafluoropropyl ether, 1,2-dimethoxy ethane, and 1,2-diethoxy ethane.

When a cyclic carbonate organic solvent is used as an organic solvent, the bonding force of a composite separator to a positive electrode may improve under the same condition of the same charging and discharging process. Examples of the cyclic carbonate organic solvent may include ethylene carbonate, fluoroethylene carbonate, vinylene ethylene carbonate, or a mixture thereof. The amount of the cyclic carbonate organic solvent may be in a range of about 1 parts by volume to about 100 parts by volume, about 10 parts by volume to about 50 parts by volume, or about 20 parts by volume to about 40 parts by volume, based on the total volume of the organic solvent.

Examples of the lithium salt may include at least one selected from LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiAlO$_2$, LiAlCl$_4$, LiCl, LiI, LiSbF$_6$, LiPF$_3$(CF$_2$CF$_3$)$_3$, LiPF$_3$(CF$_3$)$_3$, and LiB(C$_2$O$_4$)$_2$. The amount of the lithium salt may be, for example, in a range of about 0.01 molar (M) to about 4 M, about 0.01 M to about 2 M, or about 0.1 M to about 1 M.

The lithium battery according to an embodiment may have improved capacity and lifespan characteristics. Thus, the lithium battery may be utilized not only in a battery cell used as a power in small-sized devices, but also in a battery pack including a plurality of battery cells or a unit battery of a battery module as a power in medium- or large-sized devices. The lithium metal battery according to an embodiment may have improved voltage characteristics, capacity, and energy density, and thus is useful in mobile phones, laptop computers, storage batteries for power generating units using wind power or sunlight, electric vehicles, uninterruptable power supplies (UPS), household storage batteries, and the like.

Examples of the medium- or large-sized devices may include electric cars, such as electric vehicles (EV), hybrid electric vehicles (HEV), plug-in hybrid electric vehicles (PHEV), electric two-wheeled vehicles, such as E-bikes and E-scooters, power tools, and power storage systems. However, embodiments are not limited thereto.

The term "alkyl" group as used herein refers to a group derived from a completely saturated, branched or unbranched (or a straight or linear) hydrocarbon.

Non-limiting examples of the alkyl group may include methyl, ethyl, n-propyl, isopropyl, n-butyl, isobutyl, sec-butyl, t-butyl, iso-pentyl, neo-pentyl, iso-amyl, n-hexyl, 3-methylhexyl, 2,2-dimethylpentyl, 2,3-dimethylpentyl, and n-heptyl.

At least one hydrogen atom of the "alkyl" group may be substituted with a halogen atom, a C$_1$-C$_{20}$ alkyl group substituted with a halogen atom (e.g., CCF$_3$, CHCF$_2$, CH$_2$F, and CCl$_3$), a C$_1$-C$_{20}$ alkoxy group, a C$_2$-C$_{20}$ alkoxyalkyl group, a hydroxyl group, a nitro group, a cyano group, an amino group, an amidino group, a hydrazine group, a hydrazone group, a carboxyl acid or a salt thereof, a sulfonyl group, a sulfamoyl group, a sulfonic acid or a salt thereof, a phosphoric acid or a salt thereof, a C$_1$-C$_{20}$ alkyl group, a C$_2$-C$_{20}$ alkenyl group, a C$_2$-C$_{20}$ alkynyl group, a C$_1$-C$_{20}$ heteroalkyl group, a C$_6$-C$_{20}$ aryl group, a C$_6$-C$_{20}$ arylalkyl group, a C$_6$-C$_{20}$ heteroaryl group, a C$_7$-C$_{20}$ heteroarylalkyl group, a C$_6$-C$_{20}$ heteroaryloxy group, a C$_6$-C$_{20}$ heteroaryloxy alkyl group, or a C$_6$-C$_{20}$ heteroarylalkyl group.

Hereinafter one or more embodiments will be described in further detail with reference to Examples and Comparative Examples. However, these examples are only for illustrative purposes and are not intended to limit the scope of the one or more embodiments of the present disclosure.

EXAMPLES

Example 1: Manufacture of Positive Electrode-Composite Separator Assembly

First, 100 grams (g) of Al$_2$O$_3$ having an average diameter of about 500 nanometers (nm) and 1.5 g of triethoxyvinylsilane (dispersing agent) were added to 300 g of acetone. Then, the mixture was subject to milling using a bead mill for about 2 hours to prepare 25 percent by weight (wt %)-Al$_2$O$_3$ acetone dispersion.

A block copolymer (BMV) represented by Formula 4a was added to acetone to obtain a 10 wt %-block copolymer mixture.

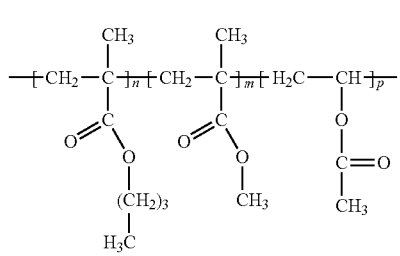

Formula 4a

In Formula 4, n was 0.4, m was 0.1, and p was 0.5.

The block copolymer had a weight average molecular weight of about 600,000 Daltons, a glass transition temperature of about 36° C. to about 38° C., and a viscosity of about 650 cP at about 25° C. as a 10 weight percent (wt %) acetone mixture.

The block copolymer mixture was added to the 25 wt %-Al$_2$O$_3$ acetone dispersion to obtain a mixture. The obtained mixture was stirred for about 24 hours to obtain a coating film composition. The amount of Al$_2$O$_3$ in the coating film composition was about 500 parts by weight based on 100 parts by weight of the block copolymer.

The above-obtained coating film composition was coated on a PE/PP separator, dried at about 60° C. to form a coating film having a thickness of about 3 μm, thereby obtaining a composite separator.

Separately, LiCoO$_2$, a conductive agent (Super-P; available from Timcal Ltd.), polyvinylidene fluoride (PVdF), and N-pyrrolidone were mixed together to obtain a positive active material layer composition. In the positive active material layer composition, a mixture weight ratio of the LiCoO$_2$ to the conductive agent to PVDF was about 97:1.5:1.5.

The positive active material layer composition was coated on an aluminum foil having a thickness of about 15 μm, and then dried at 25° C., followed by drying at about 110° C. under a vacuum atmosphere, thereby manufacturing a positive electrode.

The coating film of the composite separator was disposed to contact an upper surface of the positive electrode. Subsequently, a negative electrode was disposed on an upper surface of a polyethylene/polypropylene (PE/PP) separator having a thickness of about 12 μm of the composite separator. A liquid electrolyte was then injected thereto, thereby manufacturing a lithium secondary battery.

The negative electrode was manufactured as follows.

97.5 wt % of graphite particles (XF10), 1.5 wt % of styrene-butadiene-rubber (SBR) as a binder, and 1 wt % of CMC were mixed together and then with distilled water. The mixture was stirred using a mechanical stirrer for about 60 minutes to prepare a negative active material layer composition. The negative active material layer composition was coated on a copper current collector having a thickness of about 10μ using a doctor blade to a thickness of about 60 μm, dried in a 100° C.-hot air drier for about 0.5 hours and then again at about 120° C. under vacuum for about 4 hours, and roll-pressed to manufacture the negative electrode.

The liquid electrolyte was a mixture of i) a solution of 1.15 M LiPF$_6$ dissolved in a mixed solvent of ethylene carbonate (EC), ethyl methyl carbonate (EMC), and diethyl carbonate (DEC) in a mixed volume ratio of about 3:5:2, ii)

0.2 wt % of $LiBF_4$ based on the total weight of the liquid electrolyte iii) 5.0 wt % of fluoroethylene carbonate (FEC) based on the total weight of the liquid electrolyte, iv) 0.5 wt % of vinyl ethylene carbonate (VEC) based on the total weight of the liquid electrolyte, and v) 3.0 wt % of succinonitrile (SN) based on the total weight of the liquid electrolyte.

The first charging and discharging cycle was carried out by charging with a constant current of about a 0.1 C rate until the voltage reached about 4.35 V (vs. Li), and then charged again with a constant voltage until the current reached about a 0.01 C rate. After charging was complete, a cell was rested for about 10 minutes, and then discharged with a constant current of about a 0.1 C rate until the voltage reached about 3 V. The second charging and discharging cycle was carried out in the same manner as in the first charging and discharging cycle.

Example 2

A lithium secondary battery was manufactured in the same manner as in Example 1, except that a liquid electrolyte in the following description was used.

The liquid electrolyte was a mixture of i) a solution of 1.15 M $LiPF_6$ dissolved in a mixed solvent of EC, EMC, and DMC at a volume ratio of about 4:1:7.

Example 3

A lithium secondary battery was manufactured in the same manner as in Example 1, except that a liquid electrolyte in the following description was used.

The liquid electrolyte was a mixture of i) a solution of 1.15 M $LiPF_6$ dissolved in a mixed solvent of EMC and DMC at a volume ratio of about 1:7.

Example 4

A lithium secondary battery was manufactured in the same manner as in Example 1, except that a liquid electrolyte in the following description was used.

The liquid electrolyte was a mixture of i) a solution of 1.15 M $LiPF_6$ dissolved in a mixed solvent of EC, EMC, and DMC at a volume ratio of about 2:1:7.

Example 5

A lithium secondary battery was manufactured in the same manner as in Example 1, except that a liquid electrolyte in the following description was used.

The liquid electrolyte was a mixture of i) a solution of 1.15 M $LiPF_6$ dissolved in a mixed solvent of EC, EMC, and DMC at a volume ratio of about 7:1:7.

Example 6

A lithium secondary battery was manufactured in the same manner as in Example 1, except that a liquid electrolyte in the following description was used.

The liquid electrolyte was a mixture of i) a solution of 1.15 M $LiPF_6$ dissolved in a mixed solvent of EMC and DMC at a volume ratio of about 1:7 and ii) 5.0 wt % of FEC based on the total weight of the liquid electrolyte.

Example 7

A lithium secondary battery was manufactured in the same manner as in Example 1, except that a liquid electrolyte in the following description was used.

The liquid electrolyte was a mixture of i) a solution of 1.15 M $LiPF_6$ dissolved in a mixed solvent of EMC and DMC at a volume ratio of about 1:7 and ii) 0.5 wt % of VEC based on the total weight of the liquid electrolyte.

Example 8

As in Example 1, the above-obtained coating film composition was coated on a PE/PP separator, dried at about 60° C. to form a coating film having a thickness of about 3 μm, thereby obtaining a composite separator.

Separately, $LiCoO_2$, a conductive agent (Super-P; available from Timcal Ltd.), PVdF, and N-pyrrolidone were mixed together to obtain a positive active material layer composition. In the positive active material layer composition, a mixture weight ratio of the $LiCoO_2$ to the conductive agent to PVDF was about 97:1.5:1.5.

The positive active material layer composition was coated on an aluminum foil having a thickness of about 15 μm, and then dried at 25° C., followed by drying the result at about 110° C. under a vacuum atmosphere, thereby manufacturing a positive electrode.

The coating film of the composite separator was disposed to contact an upper surface of the positive electrode. Lithium metal was used as a counter electrode on the PE/PP separator of the composite separator, and an electrolyte was injected thereto, thereby manufacturing a coin-cell.

The electrolyte was a mixture of i) a solution of 1.3 M $LiPF_6$ dissolved in a mixed solvent of EC, EMC, and DMC at a volume ratio of about 4:1:7.

Example 9

A lithium secondary battery was manufactured in the same manner as in Example 1, except that a composite separator was formed on a negative electrode, instead of on the positive electrode, and a mixture obtained as in the following was used as an electrolyte.

The electrolyte was a mixture of i) a solution of 1.3 M $LiPF_6$ dissolved in a mixed solvent of EC, EMC, and DMC at a volume ratio of about 4:1:7.

Comparative Example 1

First, $LiCoO_2$, a conductive agent (Super-P; available from Timcal Ltd.), PVdF, and N-pyrrolidone were mixed together to obtain a positive active material layer composition. In the positive active material layer composition, a mixture weight ratio of the $LiCoO_2$ to the conductive agent to PVDF was about 97:1.5:1.5.

The positive active material layer composition was coated on an aluminum foil having a thickness of about 15 μm, and then dried at 25° C., followed by drying the result at about 110° C. under a vacuum atmosphere, thereby manufacturing a positive electrode.

A negative electrode was manufactured as follows.

97.5 wt % of graphite particle (XF10), 1.5 wt % of SBR as a binder, and 1 wt % of CMC were mixed together and then with distilled water. The mixture was stirred using a mechanical stirrer for about 60 minutes to prepare a negative active material layer composition. The negative active material layer composition was coated on a copper current collector having a thickness of about 10 μm using a doctor blade to a thickness of about 60 μm, dried in a 100° C. hot air drier for about 0.5 hours and then again at about 120° C. under vacuum for about 4 hours, and roll-pressed to manufacture the negative electrode.

A PE/PP separator between the positive electrode and the negative electrode was disposed on the negative electrode, and a liquid electrolyte was injected thereto, thereby completing the manufacture of a lithium secondary battery.

The liquid electrolyte was the same as the liquid electrolyte used in Example 1.

The lithium secondary battery was subject to heat welding using a thermal roll press at a temperature of about 70° C.

Comparative Example 2

A lithium secondary battery was manufactured in the same manner as in Example 1, except that PVdF was used instead of the block copolymer in the preparation of the coating film composition for a composite separator and a PVdF coating film was formed on a PE/PP separator to a thickness of about 3 μm.

Comparative Example 3

A lithium secondary battery was manufactured in the same manner as in Comparative Example 2, except that polybutyl methacrylate (PBMA) was used instead of PVdF in the preparation of the coating film composition for a composite separator, and a PBMA coating film was formed on a PE/PP separator to a thickness of about 3 μm.

Comparative Example 4

A lithium secondary battery was manufactured in the same manner as in Comparative Example 2, except that polymethyl methacrylate (PMMA) was used instead of PVdF in the preparation of the coating film composition for a composite separator, and a PMMA coating film was formed on a PE/PP separator to a thickness of about 3 μm.

Comparative Example 5

A lithium secondary battery was manufactured in the same manner as in Comparative Example 2, except that polyvinyl acetate (PVAc) was used instead of PVdF in the preparation of the coating film composition for a composite separator, and a PVAc coating film was formed on a PE/PP separator to a thickness of about 3 μm.

Comparative Example 6

A lithium secondary battery was manufactured in the same manner as in Example 1, except that the lithium secondary battery was subject to heat welding using a thermal roll press at a temperature of about 70° C.

Comparative Example 7

A lithium secondary battery was manufactured in the same manner as in Example 2, except that the lithium secondary battery was subject to heat welding using a thermal roll press at a temperature of about 70° C.

Comparative Example 8

A lithium secondary battery was manufactured in the same manner as in Comparative Example 1, except that a liquid electrolyte was not injected thereto. In Comparative Example 8, the lithium secondary battery was not subject to charging and discharging.

Comparative Example 9

Polybutyl methacrylate, polymethyl methacrylate, and polyvinyl acetate were mixed together at a mixing ratio of about 4:1:5, and with 25 wt %-Al$_2$O$_3$ acetone dispersion and acetone as a solvent prepared in Example 1. The mixture was stirred for about 24 hours to obtain a coating film composition. The amount of Al$_2$O$_3$ in the coating film composition was about 500 parts by weight based on 100 parts by weight of the total weight of polybutyl methacrylate, polymethyl methacrylate, and polyvinyl acetate The above-obtained coating film composition was coated on a PE/PP separator, dried at about 60° C. to form a coating film having a thickness of about 3 μm, thereby obtaining a composite separator.

Separately, LiCoO$_2$, a conductive agent (Super-P; available from Timcal Ltd.), PVdF, and N-pyrrolidone were mixed together to obtain a positive active material layer composition. In the positive active material layer composition, a mixture weight ratio of the LiCoO$_2$ to the conductive agent to PVDF was about 97:1.5:1.5.

The positive active material layer composition was coated on an aluminum foil having a thickness of about 15 μm, and then dried at 25° C., followed by drying the result at about 110° C. under a vacuum atmosphere, thereby manufacturing a positive electrode.

The coating film of the composite separator was disposed to contact an upper surface of the positive electrode. Subsequently, a negative electrode manufactured in Example 1 was disposed on an upper surface of a PE/PP separator of the composite separator. A liquid electrolyte was then injected thereto, thereby manufacturing a lithium secondary battery.

The liquid electrolyte was a mixture of i) a solution of 1.15 M LiPF$_6$ dissolved in a mixed solvent of EC, EMC, and DEC in a mixed volume ratio of about 3:5:2, ii) 0.2 wt % of LiBF$_4$ based on the total weight of the liquid electrolyte iii) 5.0 wt % of FEC based on the total weight of the liquid electrolyte, iv) 0.5 wt % of VEC based on the total weight of the liquid electrolyte, and v) 3.0 wt % of SN based on the total weight of the liquid electrolyte.

Evaluation Example 1: Test of Bonding Force of Positive Electrode to Composite Separator Using Optical Microscope The lithium secondary batteries manufactured in Example 1 and Comparative Examples 1 to 5 were charged with a constant current of about a 0.1 C rate at a temperature of about 25° C. until the voltage reached about 4.35 V (vs. Li), followed by a cut-off at a current of about a 0.01 C rate, while maintaining a voltage of about 4.35 V in a constant voltage mode. Subsequently, the lithium secondary batteries were discharged with a constant current of about a 0.1 C rate until the voltage reached about 3.0 V (vs. Li). This charging and discharging cycle was repeated twice.

The lithium secondary batteries that underwent the charging and discharging cycles were disassembled to separate the composite separator from the positive electrode to test the bonding state of the positive electrode to the composite separator. Once the composite separator was separated, the surface of the positive electrode was observed with the naked eye.

By observing the transferring state of the coating film from the separator to the positive electrode, bonding status and bonding strength of the positive electrode to the separator could be determined. The observation results are shown in FIGS. 2A to 2F.

Figure 2A:
FIGS. 2A to 2F are each an image of a surface of a positive electrode, after disassembling and separating a separator from the positive electrode of lithium batteries manufactured in Example 1 to Comparative Examples 1 to 5, respectively.
Figure 2B:
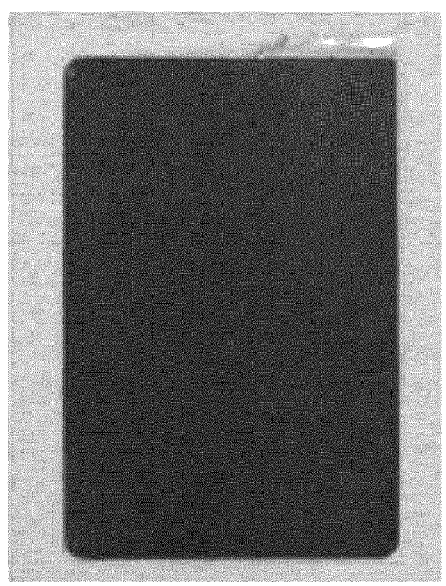
Figure 2C:
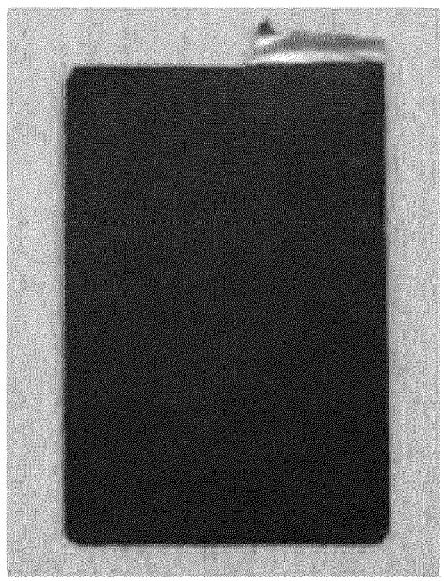
Figure 2D:
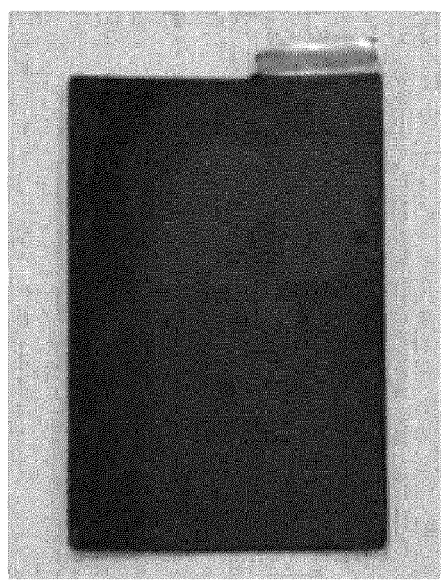
Figure 2E:
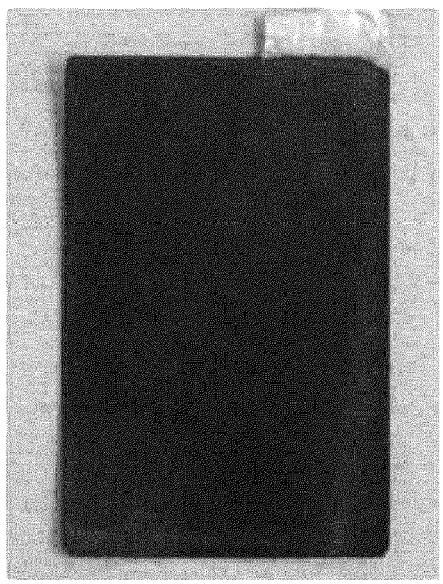
Figure 2F:

Referring to FIGS. 2A to 2F, as shown in FIG. 2A, ingredients derived from the coating film of the composite separator were found to be transferred to and remain on an upper surface of the positive electrode in the lithium secondary battery of Example 1. However, as shown in FIGS. 2B to 2F, ingredients derived from the coating film of the composite separator were not found to be transferred to an upper surface of the positive electrode in the lithium secondary battery of Comparative Examples 1 to 5. Accordingly, the lithium secondary battery of Example 1 was found to have bonding of the separator to the positive electrode with improved strength, as compared with those of Comparative Examples 1 to 5. In addition, the lithium secondary batteries of Comparative Examples 1 to 5 were found not to have bonding of the separator to the electrode.

Evaluation Example 2: Test of Bonding Force of Positive Electrode to Composite Separator Using Scanning Electron Microscope (SEM)

The lithium secondary batteries manufactured in Example 1 and Comparative Example 6 were charged with a constant current of about a 0.1 C rate at a temperature of about 25° C. until the voltage reached about 4.35 V (vs. Li), followed by a cut-off at a current of about a 0.01 C rate, while maintaining a voltage of about 4.35 V in a constant voltage mode. Subsequently, the lithium secondary batteries were discharged with a constant current of about a 0.1 C rate until the voltage reached about 3.0 V (vs. Li). This charging and discharging cycle was repeated twice.

The lithium secondary batteries that underwent the charging and discharging cycles were disassembled to separate the composite separator from the positive electrode. The condition of the separated composite separator, such as the degree of damage on a surface of the composite separator, was observed using an SEM for the analysis. In order to compare the composite separators of the lithium secondary batteries of Example 1 and Comparative Example 6 with each other, SEM analysis on the PE/PP separator was carried out. As for an SEM, FE-SEM (available from FEI, Nova 450_K) was used.

Figure 3A:
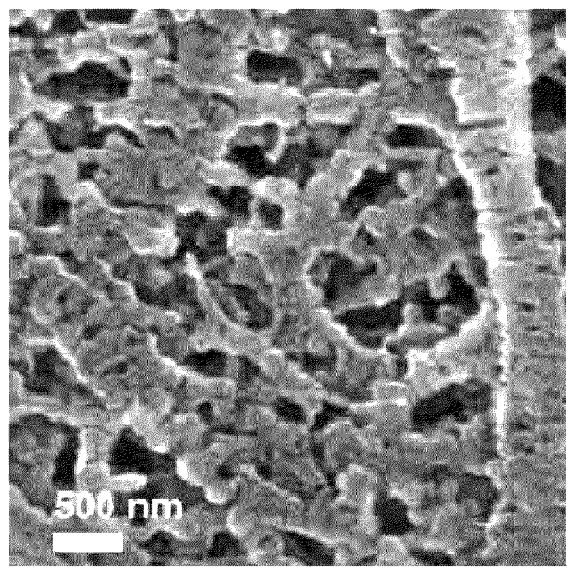
FIG. 3A is a scanning electron microscope (SEM) image of a composite separator of a lithium battery manufactured in Example 1.
Figure 3B:
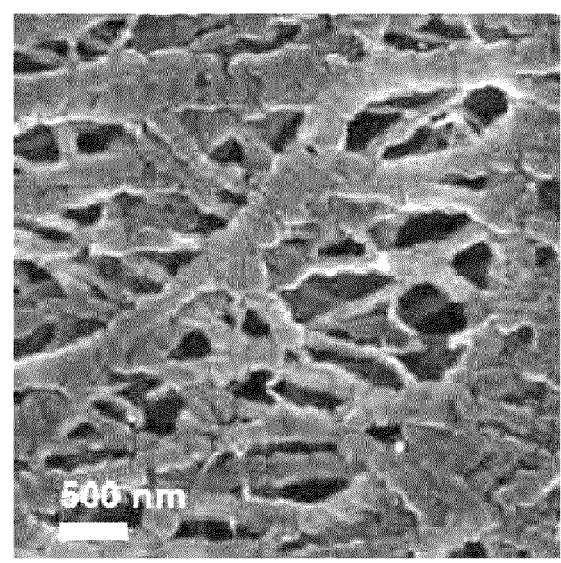
FIG. 3B is an SEM image of a polyethylene/polypropylene (PE/PP) separator of a lithium battery manufactured in Comparative Example 1.
Figure 3C:
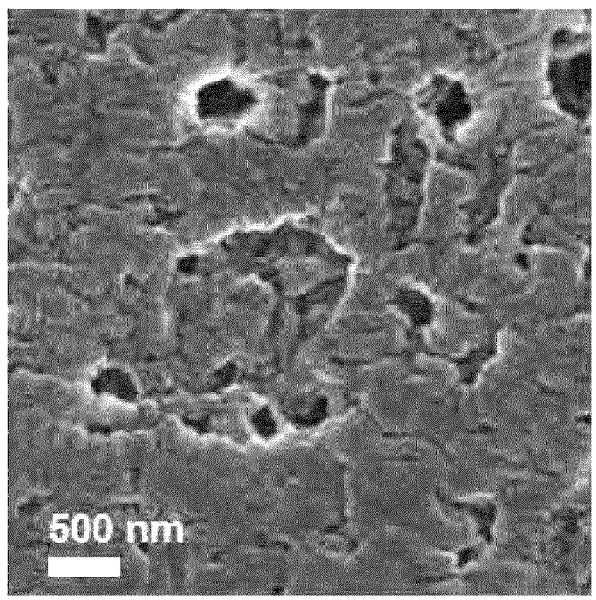
FIG. 3C is an SEM image of a composite separator of a lithium battery manufactured in Comparative Example 6.

FIGS. 3A and 3C are each an SEM image of the composite separator of the lithium secondary batteries manufactured in Example 1 and Comparative Example 6, respectively. FIG. 3B is an SEM image of the PE/PP separator.

As shown in FIG. 3C, the composite separator of the lithium secondary battery manufactured in Comparative Example 6 was found to have breaking of the porous structure formed on the PE/PP separator due to modification caused by heat and pressure. On the other hand, as shown in FIG. 3A, the lithium secondary battery manufactured in Example 1 was found to maintain the porous structure at about the same level as the PE/PP separator shown in FIG. 3B. Accordingly, due to the bonding of the composite separator to the electrode in the lithium secondary battery of Example 1, the separator itself was not damaged at all while maintaining air permeability, thus without decrease of ion conductivity. Furthermore, the lithium secondary battery of Example 1 did not undergo heat-welding, thus having little modification or damage of the separator. However, the lithium secondary battery of Comparative Example 6 that underwent heat-welding had broken pores in the separator, consequentially causing modification or damage of the separator.

Evaluation Example 3: Differential Scanning Calorimeter (DSC) Analysis

The lithium secondary batteries manufactured in Examples 2 and 3 and Comparative Examples 7 and 8 were charged with a constant current of about a 0.1 C rate at a temperature of about 25° C. until the voltage reached about 4.35 V (vs. Li), followed by a cut-off at a current of about a 0.01 C rate, while maintaining a voltage of about 4.35 V in a constant voltage mode. Subsequently, the lithium secondary batteries were discharged with a constant current of about a 0.1 C rate until the voltage reached about 3.0 V (vs. Li). This charging and discharging cycle was repeated twice.

The lithium secondary batteries that underwent the charging and discharging cycles were disassembled to separate the negative electrode from the lithium secondary battery. DSC analysis was performed on the result without the negative electrode in a nitrogen atmosphere by heating up to a temperature of about 600° C. at a heating rate of about 5° C./min. As for a DSC analyzer, an SDT2 Mettler (available from Mettler Toledo) was used.

Figure 4:
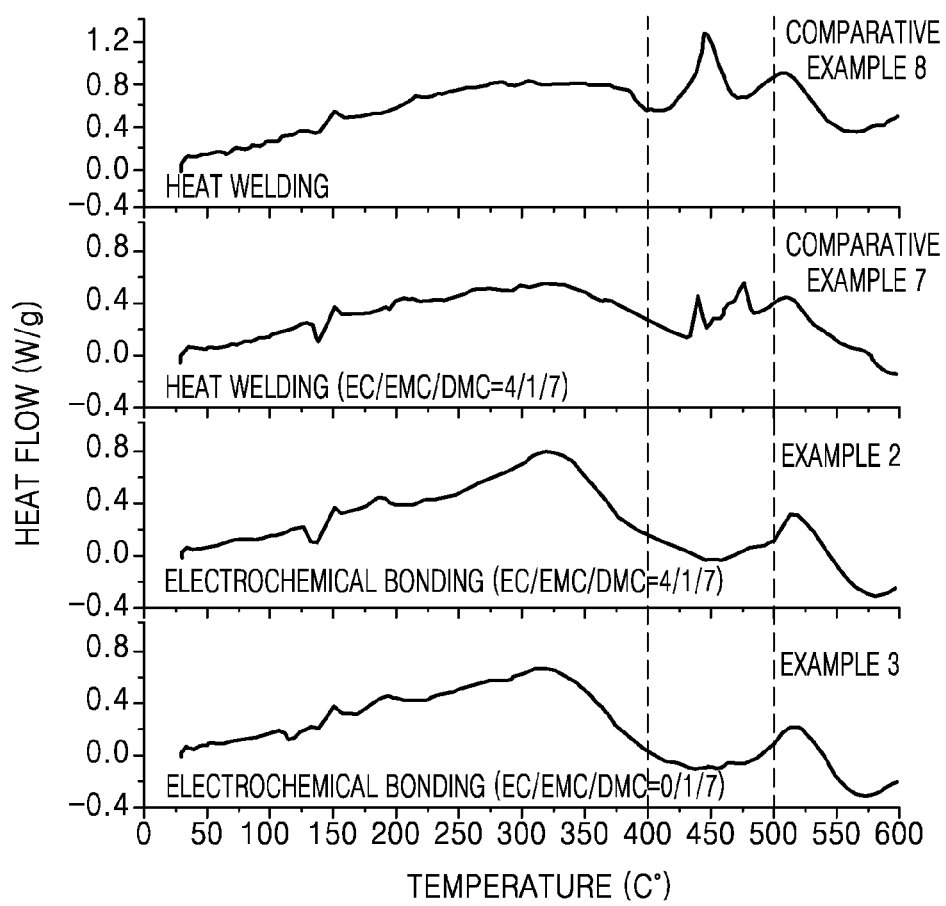
FIG. 4 is a graph of heat flow (Watts per gram, W/g) versus temperature (° C.) and illustrates the results of differential scanning calorimeter (DSC) analysis on lithium secondary batteries manufactured in Examples 2 and 3 and Comparative Examples 7 and 8 from which a negative electrode is separated.

The DSC analysis result is shown in FIG. 4.

Referring to FIG. 4, the composite separator of the lithium secondary batteries of Comparative Examples 7 and 8 exhibited exothermic peaks (Pc) at a temperature in a range of about 400° C. to about 500° C. in the DSC analysis. On the other hand, the composite separator of the lithium secondary batteries of Examples 2 and 3 did not exhibit the exothermic peaks (Pc) that appeared in the case of Comparative Examples 7 and 8 at a temperature in a range of about 400° C. to about 500° C. in the DSC analysis. Accordingly, it was found that the chemical characteristics of the interface between the positive electrode and the composite separator of Examples 2 and 3 were different than those of Comparative Examples 7 and 8.

Evaluation Example 4: Thermogravimetric Analysis (TGA)

The lithium secondary batteries manufactured in Examples 2 and 3 and Comparative Examples 7 and 8 were charged with a constant current of about a 0.1 C rate at a temperature of about 25° C. until the voltage reached about 4.35 V (vs. Li), followed by a cut-off at a current of about a 0.01 C rate, while maintaining a voltage of about 4.35 V in a constant voltage mode. Subsequently, the lithium secondary batteries were discharged with a constant current of about a 0.1 C rate until the voltage reached about 3.0 V (vs. Li). This charging and discharging cycle was repeated twice.

The lithium secondary batteries that underwent the charging and discharging cycles were disassembled to separate the negative electrode from the lithium secondary battery. TGA was performed on the result without the negative electrode in air atmosphere by heating up to a temperature of about 600° C. at a heating rate of about 5° C./min. As for a TGA analyzer, TA Q5000 (available from TA Instrument) was used.

Figure 5:
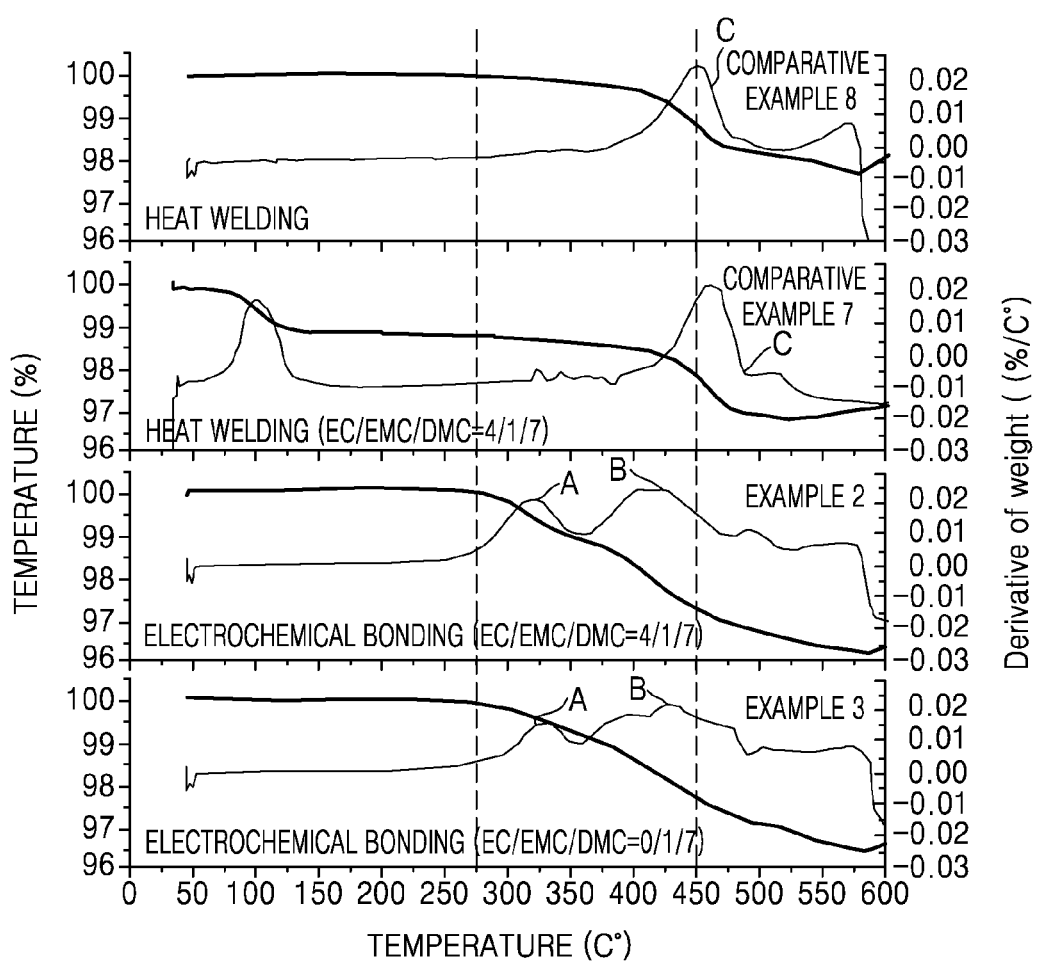
FIG. 5 is a graph of temperature (° C.) and derivative of weight (percent per ° C., %/° C.) versus temperature (° C.), and illustrates the results of thermogravimetric analysis (TGA) on lithium secondary batteries manufactured in Examples 2 and 3 and Comparative Examples 7 and 8 from which a negative electrode is separated.

The TGA result is shown in FIG. 5.

Referring to FIG. 5, a first peak (A) appeared at a temperature in a range of about 275° C. to about 450° C., and a second peak (B) appeared at a temperature in a range of about 375° C. to about 450° C. in a derivative thermogravimetric (DTG) curve shown in TGA on the composite separator of the lithium secondary batteries of Examples 2 and 3. In addition, a peak (C) appeared in DTG curve shown in TGA on the composite separator of the lithium secondary batteries of Comparative Examples 7 and 8 may be essentially different than the second peak (B) of the lithium secondary batteries of Examples 2 and 3.

Accordingly, it was found that the thermal characteristics of the interface between the positive electrode and the composite separator of Examples 2 and 3 were different than those of Comparative Examples 7 and 8.

Evaluation Example 5: Charging and Discharging Characteristics

The lithium secondary batteries manufactured in Example 1 and Comparative Example 1 were charged with a constant current of about a 0.1 C rate at a temperature of about 25° C. until the voltage reached about 4.35 V (vs. Li), followed by a cut-off at a current of about a 0.01 C rate, while maintaining a voltage of about 4.35 V in a constant voltage mode. Subsequently, the lithium secondary batteries were discharged with a constant current of about a 0.1 C rate or 1.0 C rate until the voltage reached about 3.0 V (vs. Li). This charging and discharging cycle was repeated 500 times.

Figure 6:
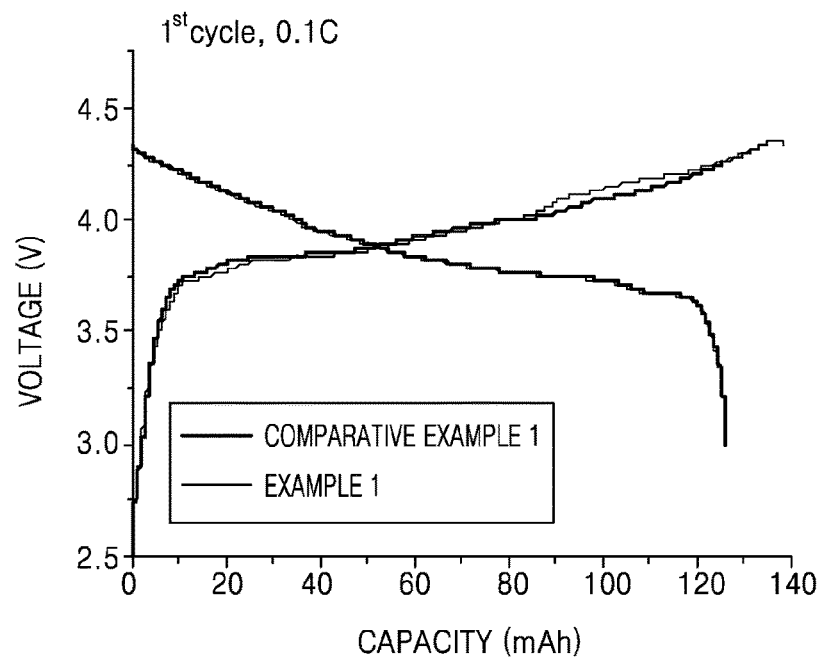
FIG. 6 is a graph of voltage (Volts, V) versus capacity (milliampere hours, mAh), illustrating the initial charging and discharging profile of lithium secondary batteries manufactured in Example 1 and Comparative Example 1.

FIGS. 6. to 8 are graphs of the voltage profiles according to the number of cycles of the lithium secondary batteries of Example 1 and Comparative Example 1. The initial capacity and cycle characteristics of the lithium secondary battery of Example 1 and Comparative Example 1 are shown in Table 1.

TABLE 1

| Classification | Discharge capacity at the 1$^{st}$ cycle (mAh) | Discharge capacity at the 100$^{th}$ cycle (mAh) | Discharge capacity at the 500$^{th}$ cycle (mAh) |
| --- | --- | --- | --- |
| Example 1 | 22.08 | 18.9 | 85.6 |
| Comparative Example 1 | 22.02 | 18.49 | 84.0 |

Figure 7:
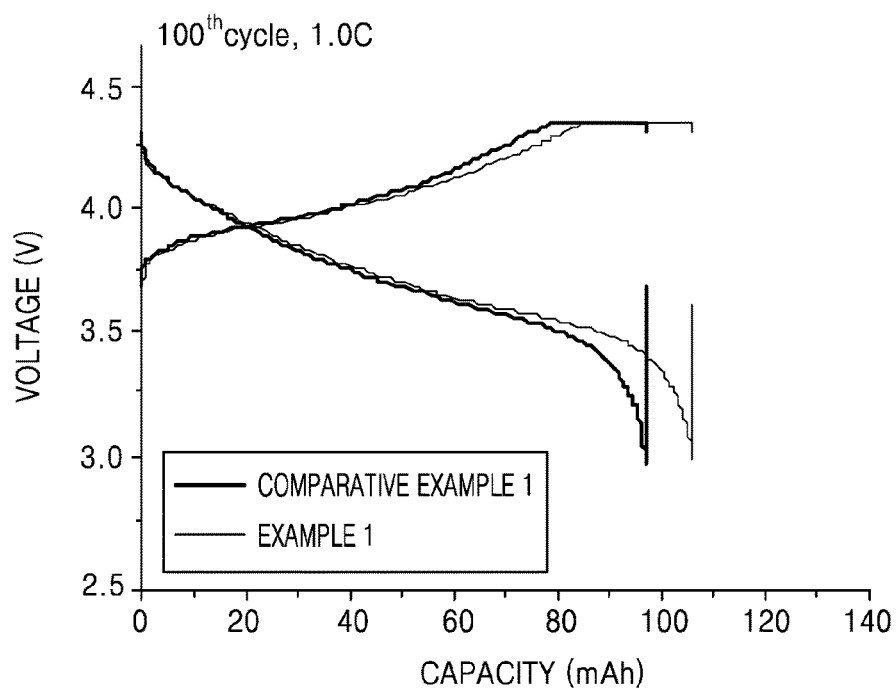
FIG. 7 is a graph of voltage (V) versus capacity (mAh), illustrating the charging and discharging profile of lithium secondary batteries manufactured in Example 1 and Comparative Example 1 at the $100^{th}$ cycle of charging and discharging.
Figure 8:
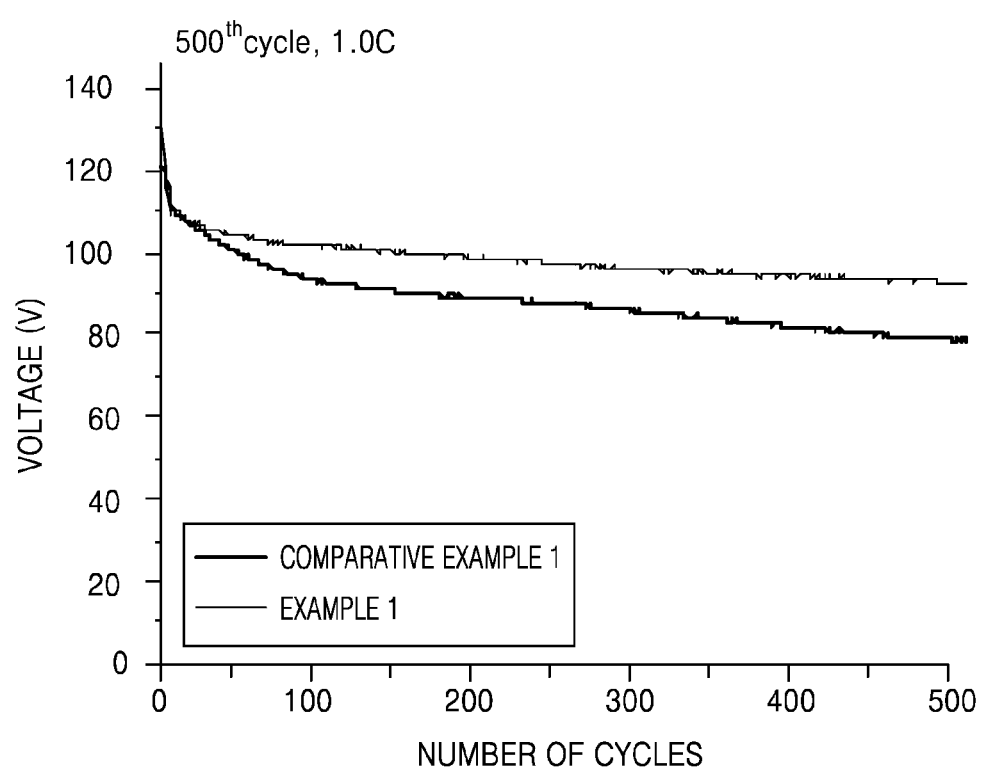
FIG. 8 is a graph of capacity (mAh) versus number of cycles, illustrating the capacity retention of lithium secondary batteries manufactured in Example 1 and Comparative Example 1.

Referring to Table 1 and FIGS. 6 to 8, the lithium secondary battery of Example 1 was found to have improved initial characteristics and lifespan characteristics, as compared with those of the lithium secondary battery of Comparative Example 1.

In addition, resulting from the evaluation of the charging and discharging characteristics on the lithium secondary batteries of Example 1 and Comparative Example 9 the lithium secondary battery of Comparative Example 9 was found to exhibit substantially decreased initial characteristics and lifespan characteristics, as compared with those of lithium secondary battery of Example 1.

Evaluation Example 6: Test of Bonding Force of Positive Electrode to Composite Separator The lithium secondary batteries manufactured in Examples 2 to 7 were charged with a constant current of about a 0.1 C rate at a temperature of about 25° C. until the voltage reached about 4.35 V (vs. Li), followed by a cut-off at a current of about a 0.01 C rate, while maintaining a voltage of about 4.35 V in a constant voltage mode. Subsequently, the lithium secondary batteries were discharged with a constant current of about a 0.1 C rate until the voltage reached about 3.0 V (vs. Li). This charging and discharging cycle was repeated twice.

The lithium secondary batteries that underwent the charging and discharging cycle were disassembled to separate the composite separator from the positive electrode to test the bonding state of the positive electrode to the composite separator. Once the composite separator was separated, the surface of the positive electrode was observed with the naked eye. By observing the transferring state of the coating film from the separator to the positive electrode, bonding status and bonding strength of the positive electrode to the separator could be evaluated. The result of surface observation analysis on the lithium secondary batteries of Examples 3, 4, 2, 5, 6, and 7 are shown in FIGS. 9A to 9F, respectively.

Figure 9A:
FIGS. 9A to 9F are each an image of a surface of lithium secondary batteries of Examples 3, 4, 2, 5, 6, and 7, respectively.
Figure 9B:
Figure 9C:
Figure 9D:
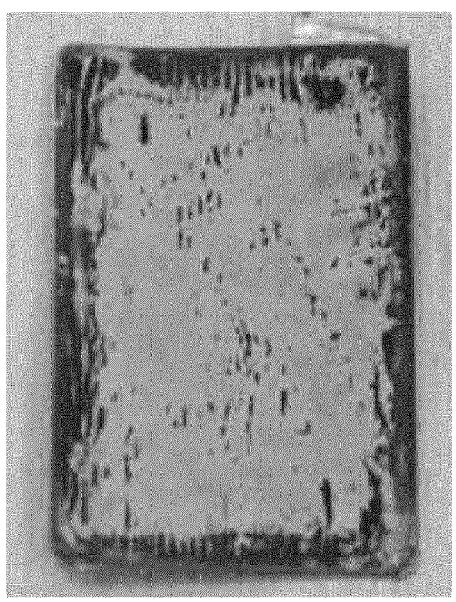
Figure 9E:
Figure 9F:

Referring to FIGS. 9A to 9F, it was found that the lithium secondary batteries of Example 2, Example 4, and Example 5 had improved bonding force of the positive electrode to the composite separator, as compared with the lithium secondary battery of Example 3. Accordingly, it was found that as the amount of EC, which is one of cyclic carbonates, in an electrolyte increases, bonding force of the positive electrode to the composite separator improves under the same charging and discharging conditions. Referring to FIGS. 9E and 9F, the lithium secondary batteries of Examples 6 and 7 were found to have improved bonding force of the positive electrode to the composite separator, as compared with that of the lithium secondary battery of Example 3. Accordingly, it was found that when an electrolyte includes a cyclic carbonate, such as FEC or VEC, bonding force of the positive electrode to the composite separator may further improve.

Evaluation Example 7: Test of Bonding Force of Electrode to Composite Separator Depending on Charging and Discharging Voltage Range The coin-cells manufactured in Examples 8 and 9 underwent a charging and discharging process as in Example 1, except that the charging and discharging process was carried out at voltage ranges shown in FIGS. 10A and 10B, with a 0.1 C rate for 2 cycles.

The lithium secondary batteries that underwent the charging and discharging cycles were disassembled to separate the composite separator from the positive electrode. The separated composite separator was observed with the naked eye so as to investigate the state of the composite separator.

The images of the coin-cells manufactured in Examples 8 and 9 are shown in FIGS. 10A and 10B, respectively.

Referring to FIG. 10A, when charging and discharging, it was found that bonding area of the positive electrode to the composite separator increased at a voltage ranging from about 3.0 V to about 4.4 V.

Referring to FIG. 10B, when charging and discharging, it was found that bonding area of the negative electrode to the composite separator increased at a voltage ranging from about 1.0 V to about 0.001 V.

Referring to the results shown in FIGS. 10A and 10B, it was found that bonding force of the composite separator to the electrodes may differ depending on charging and discharging voltage range. Furthermore, referring to FIGS. 10A and 10B, it was found that bonding force of the composite separator to the positive electrode is stronger than that of the composite separator to the negative electrode.

As described above, in an electrode composite separator assembly according to one or more embodiments, there is no separate bonding process of a composite separator to electrodes, and thus, cell parts may be prevented from being damaged by heat or pressure that may occur during a heat and pressure bonding process, to provide reduced manufacture time and cost. When the above-described electrode-composite separator assembly is used, a lithium battery may have improved initial characteristics and lifespan characteristics.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A lithium battery comprising an electrode-composite separator assembly and an electrolyte, the electrode-composite separator assembly comprising:
   an electrode; and
   a composite separator, wherein the composite separator comprises
      a separator, and
      a coating film disposed on a surface of the separator, wherein the coating film comprises
         a block copolymer represented by Formula 4a or Formula 4b, and
         at least one selected from an inorganic particle and an organic-inorganic particle,
   wherein the electrode-composite separator assembly does not have an exothermic peak between 400° C. to 480° C. when analyzed by differential scanning calorimetry,
   wherein the electrolyte comprises a lithium salt and an organic solvent, and wherein the at least one selected from an inorganic particle and an organic-inorganic particle is at least one selected from $Al_2O_3$, $SiO_2$, $B_2O_3$, $Ga_2O_3$, $TiO_2$, $SnO_2$, $BaTiO_3$, $Pb(Zr_aTi_{1-a})O_3$ wherein $0 \leq a \leq 1$, $Pb_{1-x}La_xZr_yO_3$ wherein $0<x<1$ and $0<y<1$, $Pb(Mg_3Nb_{2/3})_3$, $PbTiO_3$, $HfO_2$, $SrTiO_3$, $SnO_2$, $CeO_2$, MgO, NiO, CaO, ZnO, $Y_2O_3$, $Al_2O_3$, $TiO_2$, SiC, $ZrO_2$, a borosilicate, $BaSO_4$, a nanoclay, fumed silica, fumed alumina, graphite oxide, graphene oxide, and a metal-organic framework,
   wherein an amount of the at least one selected from an inorganic particle and an organic-inorganic particle is in a range of about 500 parts by weight to about 5,000 parts by weight, based on 100 parts by weight of a total weight of the copolymer,

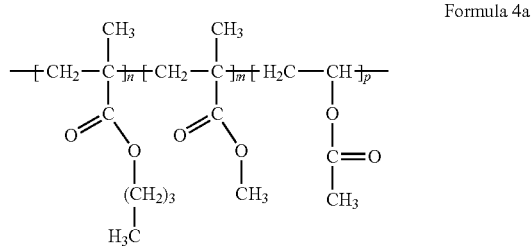

Formula 4a

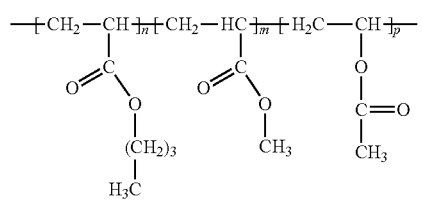

Formula 4b wherein, in Formula 4a and Formula 4b, n, m, and p are each independently in a range of about 0.01 to about 0.99, and wherein a sum of n, m, and p is 1.

2. The lithium battery of claim 1,
   wherein, when analyzed by thermogravimetric analysis, the electrode-composite separator assembly has a peak in a derivative thermogravimetric curve at a temperature between 275° C. to 375° C.,
   wherein the derivative thermogravimetric curve is a first derivative of a thermogravimetric analysis curve of the electrode-composite separator assembly.

3. The lithium battery of claim 1, wherein the electrode-composite separator assembly has an exothermic peak at a temperature between 275° C. to 400° C. when the electrode-composite separator assembly is analyzed by differential scanning calorimetry.

4. The lithium battery of claim 1, wherein a thickness of the coating film is in a range of about 1 micrometer to 5 micrometers, and a thickness of the composite separator is in a range of about 5 micrometers to about 30 micrometers.

5. The lithium battery of claim 1, wherein a weight-average molecular weight of the copolymer is in a range of about 400,000 Daltons to about 1,000,000 Daltons.

6. The lithium battery of claim 1, wherein a porosity of the composite separator is in a range of about 40% to about 90%.

7. The lithium battery of claim 1, wherein the organic solvent comprises a cyclic carbonate.

* * * * *